US008342547B2

(12) United States Patent
Gerrard

(10) Patent No.: US 8,342,547 B2
(45) Date of Patent: Jan. 1, 2013

(54) VEHICLE SUSPENSION

(75) Inventor: Miles Barnaby Gerrard, Copenhagen (DK)

(73) Assignee: M. B. Gerrard V/Miles B. Gerrard, Copenhagen (DK)

( * ) Notice: Subject to any disclaimer, the term of this patent is extended or adjusted under 35 U.S.C. 154(b) by 40 days.

(21) Appl. No.: 13/120,846

(22) PCT Filed: Sep. 25, 2009

(86) PCT No.: PCT/EP2009/062440
§ 371 (c)(1),
(2), (4) Date: May 18, 2011

(87) PCT Pub. No.: WO2010/034807
PCT Pub. Date: Apr. 1, 2010

(65) Prior Publication Data
US 2012/0013095 A1 Jan. 19, 2012

Related U.S. Application Data

(60) Provisional application No. 61/100,512, filed on Sep. 26, 2008.

(30) Foreign Application Priority Data

Sep. 26, 2008 (DK) .................................. 2008 01333
Mar. 12, 2009 (DK) .................................. 2009 00351

(51) Int. Cl.
*B60G 3/12* (2006.01)
*B60G 11/18* (2006.01)
*B62D 17/00* (2006.01)

(52) U.S. Cl. ....... 280/124.128; 280/86.758; 280/93.512; 280/124.166

(58) Field of Classification Search ............... 280/86.75, 280/86.758, 93.51, 93.512, 124.107, 124.116, 280/124.125, 124.128, 124.148, 124.153, 280/124.166, 124.167
See application file for complete search history.

(56) References Cited

U.S. PATENT DOCUMENTS

| 5,685,556 A | 11/1997 | Shibue et al. |
| 6,173,977 B1 | 1/2001 | Fun |
| 7,270,340 B2 * | 9/2007 | Mosler ..................... 280/93.512 |

(Continued)

FOREIGN PATENT DOCUMENTS

DE 1077538 B 3/1960

(Continued)

OTHER PUBLICATIONS

Gerrard, "The Equivalent Elastic Mechanism: a Tool for the Analysis and the Design of Compliant Suspension Linkages", Cofap Automotive Suspension (Magneti Marelli S.p.A.), (2005).

(Continued)

*Primary Examiner* — Joseph Rocca
(74) *Attorney, Agent, or Firm* — Fish & Richardson P.C.

(57) ABSTRACT

A component or assembly for vehicle suspension comprising inter alia, a hub carrier supporting a wheel carrier, a bracket and one or more of support bodies interposed between the hub carrier and the bracket. The support bodies are supported with respect to or by the base suspension. The one or more support bodies each has a predetermined first rigidity in a first direction and a second rigidity in directions normal to the first direction, wherein the first direction is oriented such that it intersects a longitudinal and vertical plane of the vehicle and wherein the second rigidity is lower than the first rigidity.

15 Claims, 30 Drawing Sheets

U.S. PATENT DOCUMENTS

| | | | |
|---|---|---|---|
| 7,588,261 B2 * | 9/2009 | Kawanobe et al. | 280/124.128 |
| 7,914,019 B2 * | 3/2011 | Jakob | 280/86.75 |
| 8,220,810 B2 * | 7/2012 | Jakob | 280/124.128 |
| 2004/0160033 A1 | 8/2004 | Kawamata et al. | |
| 2006/0082094 A1 | 4/2006 | Mosler | |
| 2007/0052192 A1 | 3/2007 | Kawanobe et al. | |

FOREIGN PATENT DOCUMENTS

| | | |
|---|---|---|
| DE | 2311480 B2 | 10/1977 |
| DE | 3912924 A1 | 5/1990 |
| EP | 1375202 A2 | 1/2004 |
| EP | 1612068 A1 | 1/2006 |
| EP | 1640249 A1 | 3/2006 |
| EP | 1757468 A1 | 2/2007 |
| FR | 2395853 A1 | 1/1979 |
| FR | 2621277 B1 | 1/1993 |
| FR | 2827222 A1 | 1/2003 |
| FR | 2861335 A1 | 4/2005 |
| JP | 4287708 A | 10/1992 |
| JP | 2000025438 A | 1/2000 |
| JP | 2005119601 A | 5/2005 |
| JP | 2005329908 A | 12/2005 |

OTHER PUBLICATIONS

Alexander D: "Mechanical Advantage" Automotive Engineering, Society of Automotive Engineeers. Warrendale, US, vol. 112, No. 7, Jul. 1, 2004, pp. 38, 40, 42, 44, XP001224657 ISSN: 0098-2571.

Lucia Celiberti et al."The Floating Hub: An Innovative Device to Improve Vehicle Comfort" SAE 2004 World Congress & Exhibition, Mar. 2004, XP009129773 Detroit, MI, USA.

\* cited by examiner

VEHICLE SUSPENSION

CROSS REFERENCE TO PRIOR APPLICATIONS

This is a U.S. National Phase application under 35 U.S.C. §371 of International Patent Application No. PCT/EP2009/062440, filed Sep. 25, 2009, and claims the priority of Danish Patent Application No. PA200801333, filed Sep. 26, 2008; U.S. Provisional Application No. 61/100,512, filed Sep. 26, 2008; and Danish Patent Application No. PA200900351, filed Mar. 12, 2009, all of which are incorporated by reference herein. The International Application published in English on Apr. 1, 2010 as WO 2010/034807 under PCT Article 21(2).

The present invention relates to a vehicle suspension encompassing elastic axes ensuring specific responses of a wheel in response to different applied loads.

According to one aspect, the present invention relates to a compliant system for a base suspension of a vehicle. The system comprising inter alia:
- a support configured to be supported by the base suspension,
- a hub carrier attached to the support by means of a compliant connection, where the hub carrier is configured for supporting a wheel carrier,
- support bodies at least partially interconnecting, at connection points, the support and the hub carrier and forming part of the compliant connection between the hub carrier and the support. The support bodies are configured for providing the system with a first resistance to movement in a first direction and a second resistance to movement in directions normal to the first direction and where theoretical axes, defined by the first directions converge or meet at a virtual focal point or area lying outside confines defined by a wheel mounted on the wheel carrier.

BACKGROUND

Over the 120 years that motor vehicles have existed, their suspension systems have evolved considerably. This evolution has been driven primarily by a continuously developing understanding of the influence exerted by the suspension on the behaviour of the vehicle, and consequently the properties required of the suspension in order to ensure a vehicle with favourable driving characteristics.

In modern vehicles, a suspension system can be described as a system of components connecting a wheel carrier incl. a wheel to the vehicle structure.

The suspension system of a modern vehicle is typically a linkage system consisting of rigid load-bearing links capable of articulating about joints which usually takes the form of rubber bushings.

Suspension architectures can be categorised into architectures which vary in their complexity and as a consequence thereof, their cost and performance.

Examples of common suspension architectures are the MacPherson strut, the double wishbone, the live axle and the twist beam axle.

Suspension architectures can be further divided into three main categories according to their degree of interconnection between the left and right hand wheels of an axle, the categories are:
  independent,
  semi-dependent, and
  dependent.

In an independent suspension system, the left and right hand wheels have no connection between them (apart from contingent anti-roll bars which are typically ignored under these definitions) and have therefore no influence on one another's movement. The independent suspension system is typically applied forward and/or aft of premium class vehicles and/or high performance vehicles.

In a dependent suspension system, the left and right hand wheel carriers are rigidly connected to one another. The dependent suspension system is typically applied forward and/or aft of heavy commercial vehicles.

In a semi-dependent suspension system, the left and right hand wheel carriers are not rigidly connected. The connection between the left and right hand wheels is such that sufficient stiffness is obtained to allow the movement of one wheel to significantly affect that of the opposite wheel. Such suspension system may encompass a so-called twist beam axle, and is the most common architecture in this category. The semi-dependent suspension system, and in particular the twist beam axle is, typically due to cost considerations, applied aft of small and medium class vehicles, while the forward system typically comprise an independent suspension system, e.g. such as the abovementioned MacPherson strut.

As per the above, the front suspension systems of modern passenger cars are, almost without exception, independent suspensions systems (again, apart from contingent anti-roll bars), whilst the rear suspension systems tend to be divided between independent systems on higher cost cars and semi-dependent systems on lower cost cars.

The modern suspension system has various functions; some are obvious, others are less so. Its primary functions are:
  structural: Transmission of forces generated at the contact patch between the tyre and the road to the main mass of the vehicle,
  handling: Ensuring that, when the wheel is subject to the forces generated by events such as braking, cornering and acceleration, or when it is subject to vertical displacements, a precise and predefined displacement of the wheel takes place relative to the vehicle structure. For example, during braking and cornering it is necessary for the wheels to steer very slightly in proportion to the force generated by the tyre to ensure a vehicle behaviour which results in both comfort of the passengers and also safe and stable manoeuvring, and
  comfort: Isolating (preferably) the passenger compartment of the vehicle from the irregularities of the road surface over which the vehicle is moving.

The characteristics of the comfort-increasing "vibration filter" are different according to the frequency (e.g. resulting from the speed of a vehicle), amplitude and direction of the inputs. The principal requirements being that a suspension system has to cope with following strains or loads originating from either irregularities in the surface over which a vehicle is travelling, or from strains or loads originating from alterations in speed and course:
  A. Low frequency ($\cong$1 Hz), high amplitude ($\pm$100 mm) in a vertical direction,
  B. Medium frequency ($\cong$10 Hz), moderate amplitude (5-10 mm), in the vertical and longitudinal directions, and
  C. High frequency (>50 Hz), low amplitude (<2 mm) in all directions.

Requirement A is by non-experts considered to be the sole function of the suspension system, and indeed the low frequency vertical isolation was the primary motive for the development of the original suspension systems on horse-drawn carriages and the like.

With today's greater driving speeds and high comfort expectations, the suspension systems are required also to cope with the requirements under B and C above, and it is in fact under these requirements, the true challenge in the design of modern passenger car suspensions arises.

As mentioned above, in the early days low frequency vertical isolation was the sole requirement of the suspension; a live axle with a simple linkage, and some form of springing, and later, damping being all that was required.

It was later realised that changes in wheel angles during the wheels vertical motion was critical to the handling performance of the vehicle.

In particular, some of the angles of interest are:

camber angle, which is the angle between a substantially vertical axis of the wheel and the vertical axis of the vehicle when viewed from the front or rear. The camber angle is in other words the wheels vertical inclination, in or out, transverse to the vehicles longitudinal axis. The angle may be obtained from static geometry of the suspension components and/or from kinematic and compliant effects of the suspension components, and toe angle, which is the angular position of the wheel with respect the longitudinal axis of the vehicle. The angle may be positive, i.e. the front of the wheels are closer together than the back of the wheels (toe-in) or negative, i.e. the back of the wheels are closer together than the front of the wheels (toe-out). The angle may be obtained from static geometry of the suspension components and/ or from possible kinematic and compliant effects of the suspension components.

The increased understanding of the desired kinematics of the wheel necessitated use of more complex linkages to control the wheel, and ultimately the use of separate linkages to control each wheel, such as independent suspension systems was conceived.

Later still came the understanding of how the wheel displaced under loads in a horizontal plane, e.g. fore/aft loads during braking or acceleration and lateral loads during cornering etc. Designers realized that changes in wheel angles as a result of wheel displacements originating from one or more of these loads was also critical to the vehicles handling response, and consequently to driver enjoyment and vehicle stability and safety.

This led to focus being placed on the compliant properties of the suspension linkage, and as a consequence, on the stiffness of the rubber bushings providing articulation between the links. Along with this came the realisation that certain types of linkage were preferred over others in order to meet the compliant requirements now being placed on the suspension.

More recently, the importance of the fore/aft flexibility, i.e. the longitudinal compliance, of the suspension system has been appreciated. It is now known that this property is vital to the suspension's ability to absorb impacts, such as bumps and potholes, and provide good road noise isolation. This is now a fundamental requirement of the suspension system, and whilst this "discovery" did not specifically lead to the development of new suspension linkages, it has in recent years heavily influenced the car manufacturer's choice of suspension architecture.

US 2004/0160033 A (BRIDGESTONE CORP.) teaches a torsion beam type suspension device comprising a pair of trailing arms spaced from each other axially of an axle and connected at front ends thereof to a car body and at rear ends thereof supporting wheels through brackets demonstrating compliant behaviour with respect to the trailing arms. A torsion beam extending axially of the axle and interconnecting the pair of trailing arms at connecting portions. The rear ends of the pair of trailing arms are connected to the brackets through rubber cushions, whereby the steering stability, according to the document, is improved.

US 2007/0052192 A (KAWANOBE) teaches an axle which rotatable supports a wheel being elastically coupled to trailing arms of a motor vehicle via an upper connecting point and first and second lower connecting points, where the trailing arms are elastically coupled to a body of the vehicle. The first and second lower connecting points are positioned lower than the upper connecting point and are mutually arranged to open a gap in a front-to-rear direction of the vehicle. The first and second lower connecting points have elastic members resulting in a stringency of the wheel carrier in all directions, and arranged so that principal elastic axes of their respective elastic members intersect at a location that is outside, in the transverse direction of the vehicle, of a grounding point of the wheel. According to the document, providing a suspension system with principal elastic axes intersecting at a location outside, in the transverse direction of the vehicle, of a grounding point of the wheel increases the running stability of the vehicle without relying on the rigidity of the elastic members, resulting in increased freedom in design of the elastic members.

US 2006/082091 A (MOSLER) teaches an independent wheel suspension comprising a wheel guiding strut which is mounted on a vehicle body. A wheel carrier is supported on the strut by several elastic pivoting bearings. According to the document, a high degree of driving comfort is provided by a controlled accommodation of lateral, longitudinal and vertical forces.

EP 1640249 A1 (PSA) teaches a vehicle having a twist beam axle base suspension with a stub axle which by means of a compliant system incorporating rubber blocks is mounted to the twist beam axle. The deflection of the stub axle is controlled by the rubber blocks and limited in its extreme positions by pins arranged in sliding slots. The document does not suggest creating an additional steer axis, as the elastic mechanism appears to be an axis trans-verse to the axis of the vehicle.

GB 2270508 A (McLaren) teaches an independent front suspension for a vehicle wherein each wheel suspension, which constitutes wishbones etc., is mounted in its entirety on a vertical sub frame which again is mounted to the vehicle chassis by means of four rubber bushings, all of which having higher radial stiffness than axial stiffness. The wishbones are pivotally and noncompliant mounted on the sub-frame. The compliance of the suspension system derives from the four rubber bushings connecting the sub-frame to the structure of the vehicle. The rubber bushings each comprise a generally hollow cylindrical elastomeric bush which is stiff radially thereof, but soft axially thereof. The axes of maximum stiffness of the bushes intercept one another to define a shear centre of the arrangement which lies on the ground. The bushings for the sub-frame are arranged such that their axes all lie in a longitudinal/vertical plane, the direction of each axis being tangential to the contact patch of the tyre. In this way, an axis of low torsional stiffness is created between the suspension linkage (and therefore the wheel carrier, as the bushings of the suspension linkage itself are all designed to be stiff) and the vehicle chassis. The suspension system seeks to generate a transverse axis of low torsional stiffness below the wheel centre in order to improve comfort. However, the document fails to suggest a vertical axis about which the wheel is allowed to move in order to improve to improve toe-in/out characteristics.

BRIEF DESCRIPTION OF THE INVENTION

The present invention seeks to improve the general performance of vehicle suspension systems, while at the same time, reduce space requirements to, as well as cost of, today's vehicle suspension systems. Further, the present inventions seeks to provide a vehicle suspension system which, compared to today's premium class suspension systems, contains significantly fewer load conveying linkage arm etc.

Up to this day, prior art has failed to teach a simple and yet reliable and inexpensive vehicle suspension system which in a safe and reliable manner, without substantially increasing the weight and/or particulars of the system, provides a low cost suspension system with properties comparable to more expensive or high end vehicle suspension systems.

According to the invention, there is provided a compliant system as per the introductory part of this specification, and in particular, upon configuring the compliant system such that the second resistance to movement provided by the support bodies, in directions normal to the first directions, are such that the connection points on the hub carrier are free, or substantially free, to move within a delimitation and in directions normal to the first directions with respect to the support. Further the first resistance to movement in the first directions is defined by a rigidity of said support bodies in said first directions, whereby an economically attractive vehicle suspension system is provided, which meets and address the abovementioned drawbacks of the prior art suspension systems.

According to one embodiment, the second resistance to movement provided by the support bodies is, under movement of the hub carrier with respect to the support, and within a delimitation or within a non-indefinite area, virtually unchanged regardless of the hub carriers position with respect to the support.

According to one embodiment, the axes, defined by the first directions are oriented such that the axes, or a component thereof, is oriented substantially transverse to the vehicle, while, at the same time, being oriented such that at least two of the axes, defined by the first directions, converge at a point or an area outside the confines of the wheel, when viewed from above.

According to one embodiment, compliant system further includes at least one elastic element interconnecting the hub carrier and the support, and where at least one elastic element is arranged such that the hub carrier is urged towards a predetermined position with respect to the support.

According to one embodiment, the support bodies constitutes an assembly of components being rigidly connected to the hub carrier and defining, by means of sliding elements cooperating together with surfaces provided on the support, sliding interfaces between the hub carrier and the support.

According to one embodiment, the support bodies constitutes an assembly inter alia made up from two opposed sliding elements arranged on a shank, where the sliding elements define the sliding interfaces on opposed sides of the support.

According to one embodiment, the support bodies constitutes an assembly of components being rigidly connected to the support and defining, by means of sliding elements cooperating together with surfaces provided on the hub carrier, sliding interfaces between the hub carrier and the support.

According to one embodiment, the support bodies constitutes an assembly inter alia made up from two opposed sliding elements arranged on a shank, where the sliding elements define the sliding interfaces on opposed sides of the hub carrier.

According to one embodiment, the assembly making up the support bodies further comprise elastic elements arranged on the shank.

According to one embodiment, the shank constitutes a bolt adapted to bring the sliding elements into compressive preload.

According to one embodiment, the compliant system comprises three assemblies constituting support bodies, such that a total of six sliding interfaces are defined, three on each face of the support.

According to one embodiment, the compliant system comprises three assemblies constituting support bodies, such that a total of six sliding interfaces are defined, three on each face of the hub carrier.

According to one embodiment, the support bodies constitutes rolling means interposed between the hub carrier and the support, where the hub carrier and the support are provided with surfaces configured for, together with the rolling means, establishing rolling interfaces.

According to one embodiment, the hub carrier and the support are interconnected by linkages, such as wires, rods or jointed links, preventing separation of the hub carrier from the support, where the linkages may be resiliently connected to the hub carrier and to the support.

According to one embodiment, the compliant system comprises three rolling means such that that a total of six rolling interfaces are defined; three interfaces on the hub carrier and three interfaces on the support.

According to one embodiment, the rolling means constitute spheres or rolls.

According to one embodiment, the hub carrier further may comprise a plurality of outer portions configured for abutting the support bodies, where the support bodies are connected to the support, and where the system further comprise a back plate provided with a plurality of outer portions configured for abutting the support bodies.

According to one embodiment, the support supports six support bodies each having a compliant or flexible portion and a sliding portion, where the flexible portion and the sliding portion in series connects the support with the hub carrier.

According to one embodiment, the outer portions of the hub carrier and the back plate has a substantially plane face oriented substantially normal to the first directions.

According to one embodiment, the substantially plane face of the outer portions of the hub carrier and the back plate forms together with the sliding portions of the support bodies, sliding interfaces.

According to one embodiment, the hub carrier and the support further comprise a plurality of outer portions configured for abutting the support bodies, where the support bodies are connected to outer portions of a back plate According to one embodiment, the back plate supports six support bodies each having a compliant or flexible portion and a sliding portion, where the flexible portion and the sliding portion in series connects the support with the hub carrier.

According to one embodiment, the hub carrier and the support are provided as a single component.

According to one embodiment, the system comprises three support bodies, where each support body comprise a sliding element and a flexible element which, in series, connect the hub carrier and the support.

According to one embodiment, the hub carrier and the support are interconnected by a linkage preventing separation of the hub carrier from the support, where the linkage is configured to bring the support bodies under compressive preload by urging the hub carrier towards the support.

According to one embodiment, the compliant system constitutes a component or assembly connecting a wheel carrier to the base suspension, where the component or assembly has a combination of predetermined translational and rotational stiffness.

According to one embodiment, the at least one component or assembly may be configured such that an axis of low rotational stiffness is obtained between the hub carrier and the base suspension.

According to one embodiment, the axis of low rotational stiffness is oriented substantially transverse to the vehicle and passes through or close to the centre of the wheel when viewed from above.

According to one embodiment, the compliant system creates an elastic system whose point of maximum translational stiffness, in a longitudinal direction, lies outboard of the centre of the wheel.

According to one embodiment, the compliant system is provided as a component or assembly prepared for being mounted onto a twist beam rear axle.

According to one embodiment, a vehicle front suspension system is provided, wherein the system comprising a compliant system according to the present invention.

According to one embodiment, a vehicle rear suspension system comprising a compliant system according to the present invention is provided.

According to one embodiment, a vehicle suspension system comprising a compliant system according to the present invention is provided. The vehicle suspension system may be applied to a wheel driven by a driveshaft, where the driveshaft may pass through the compliant system.

According to one embodiment, a vehicle suspension system comprising a compliant system according to the present invention is provided, where the vehicle suspension system further is provided with an in-wheel drive motor.

According to one embodiment, a vehicle suspension system comprising a compliant system according to the present invention is provided, where the drive motor is interposed in-between the base suspension and the compliant system.

According to one embodiment, a vehicle suspension system comprising a compliant system according to the present invention is provided, where the compliant system is attached to a steerable base suspension wherein the kingpin axis is interposed between the suspension system and a wheel.

According to one embodiment, a vehicle suspension system comprising a compliant system according to the present invention is provided, wherein the suspension is interposed between the kingpin axis and the steered wheel.

According to one embodiment, a vehicle comprising a compliant system according to the present invention is provided.

DETAILED DESCRIPTION OF THE INVENTION WITH REFERENCE TO THE FIGURES

The invention may take the form of a component or an assembly prepared for attachment to, or for integration with, a hub carrier 10, and an optional rigid support bracket 30 to be fixed to, or integral with, a base suspension 100.

The components are themselves connected to one another by means of one or more elements possibly exhibiting specific compliant properties.

The below exposition incl. various embodiments of a vehicle suspension according to the present invention are for the sake of conciseness only referred to as constituting a non-steerable rear suspension system.

The present invention is however not in any way limited to a rear suspension system. The invention may equally be applied to a front suspension or even axles interposed between a front and a rear axle.

Further, the below exposition incl. various embodiments of a vehicle suspension according to the present invention are, for the sake of conciseness only, referred to as constituting a suspension system for non driven wheels only, however the invention may equally be applied to suspension systems for driven wheels where the wheels may be driven by means of a conventional drive axle or, as an equal alternative, driven by an in-wheel motor.

Further, the present invention may be applied to steerable as well as non-steerable axles and/or suspension systems.

Figure 1:
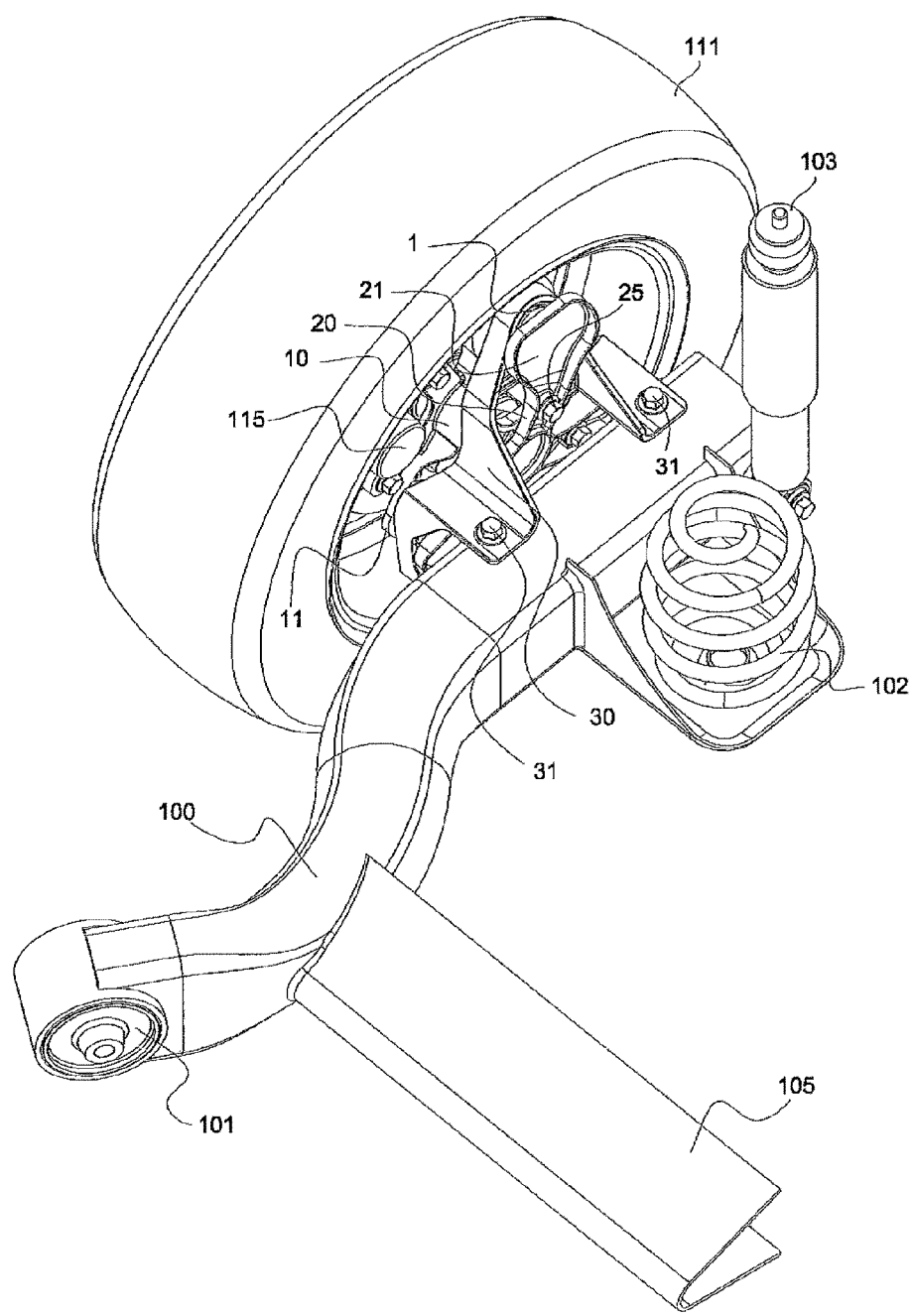
FIG. 1 is a perspective view of a part of a vehicle suspension provided with a compliant system according to one embodiment of the present invention.

FIG. 1 illustrates one embodiment of a vehicle suspension according to the present invention. The figure illustrates a right hand side rear suspension of the twist beam axle type. Numeral 100 refers to a portion of the twist beam axle which, via a bushing 101, is connected to a chassis (not shown) of a vehicle. The bushing 101, which face the forward driving direction of the vehicle, is transferring the majority of the horizontal forces induced on the axle 100 to the chassis, while a spring 102 and a shock absorber 103 transfers the majority of vertical forces induced on the axle 100 to the chassis of the vehicle.

In the embodiment according to FIG. 1, the spring 102 and the shock absorber 103 are provided as two separate components, each independently mounted between the axle 100 and the not shown chassis. The spring 102 and the shock absorber 103 may however equally be provided as one component or assembly (not shown), where the shock absorber typically is provided with means for accommodating the spring.

In the depicted embodiment, the twist beam axle 100 supports a wheel 111 by means of several components some of which are:

- a support 30 rigidly mounted onto, or integral with, a portion of the axle 100 e.g. by means of bolts 31,
- a bracket or a back-plate 20 which comprises one or more support portions 21,
- a hub carrier 10, compliantly retained in respect to the support 30, and by means of connection means 25, e.g. constituting one or more bolts or equivalent, connected to the bracket or back-plate 20. The hub carrier 10 comprises one or more support portions 11, and the hub carrier 10 supports, via bearings (not shown), a wheel carrier 109, which in the view according to FIG. 1 is hidden by the wheel 111.
- a plurality of support bodies 1, interposed between the bracket or back-plate's 20 support portions 21 and the hub carrier's 10 support portions 11 via the support 30.

The axle 100 shown in FIG. 1 is as per the above a twist beam axle where the cross bar 105 connects the shown right hand side of the suspension system to the left hand side suspension system (not shown).

Numeral 115 refers to a brake calliper supported by the hub carrier 10 and adapted to apply braking force to a brake disc 121, which in the view according to FIG. 1 is hidden by the wheel 111. The vehicle suspension system according to the present invention may perform equally well under embodiments wherein no or alternative brake mechanisms are applied, such as drum brakes and the like.

Figure 2:
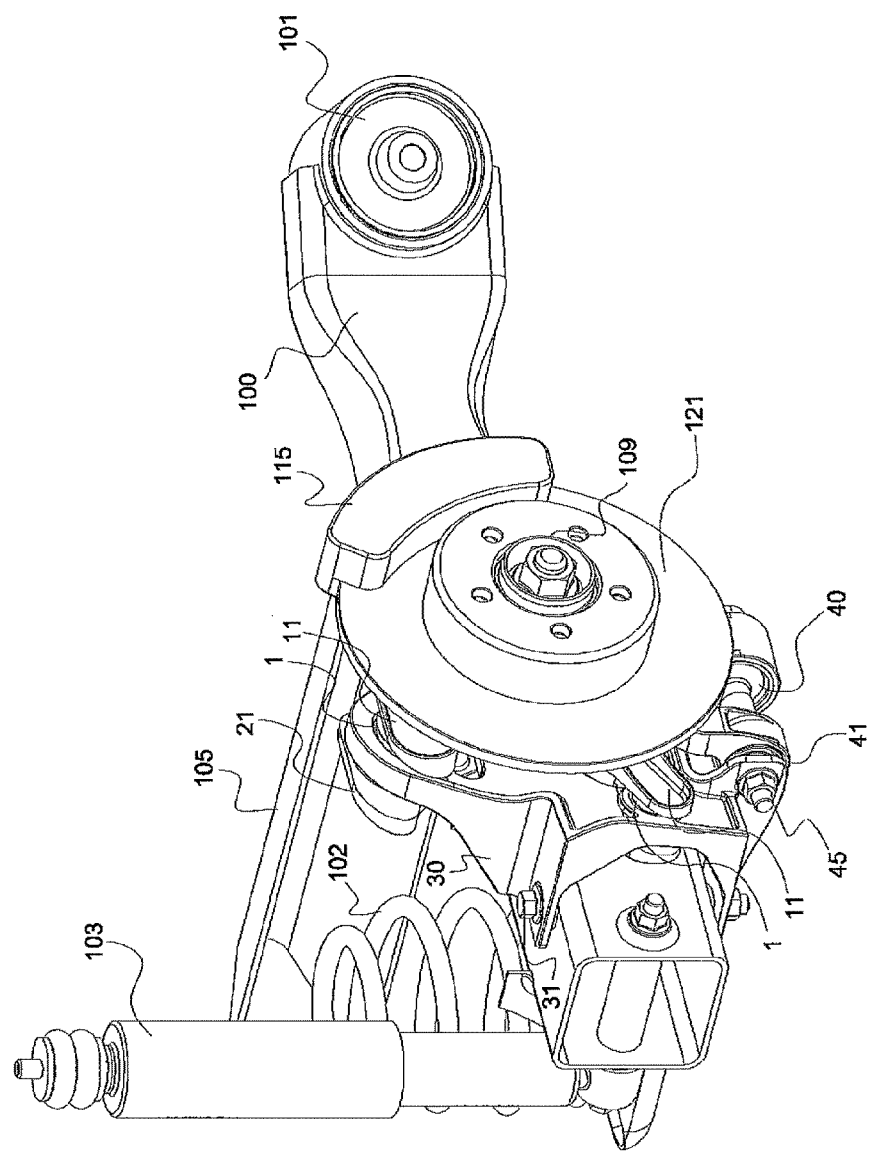
FIG. 2 is another perspective view of a part of a vehicle suspension according to FIG. 1.

FIG. 2 is another perspective view of a part of a vehicle suspension system according to FIG. 1, here shown without a wheel and under a view from outside the confines of the not shown vehicle. As this view is drawn up without the wheel, the brake disc 121 can be seen mounted on the wheel carrier 109.

Further, FIG. 2 illustrates a part of the support portions 11, 21 of the hub carrier 10 and the bracket or back plate 20 arranged such that the support portions 11, 21 abuts, or substantially abuts, the support bodies 1.

Figure 3:
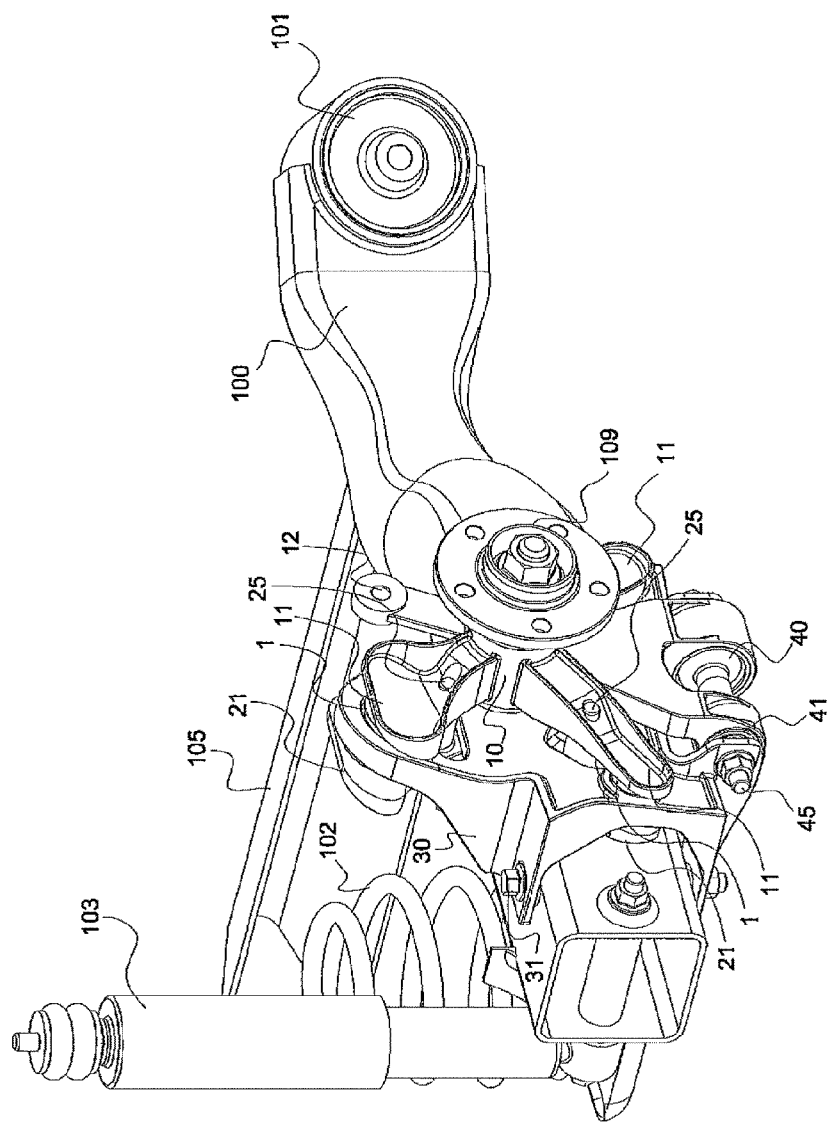
FIG. 3 is yet another perspective view of a part of a vehicle suspension according to FIG. 1.

FIG. 3 is yet another perspective view of a part of a vehicle suspension according to FIG. 1, here shown without the wheel and the brake disc incl. calliper. Numeral 12 refers to the upper support bracket for the removed brake calliper 115, and a lower support bracket is in this view hidden by wheel carrier 109.

As can be seen in the figure, two rubber bushings 40, 41 are arranged in a lowermost portion of the suspension system, such that the hub carrier 10 is, by means of connecting means 45, connected to the support 30.

The bushes or elements 40, 41 may constitute simple, plain rubber bushings having a translational stiffness in all three directions and a rotational stiffness around all three directions.

The hub carrier 10, the support 30, which in the depicted embodiment encompass the support bodies 1, and the bracket or back-plate 20 may be considered one embodiment of an assembly or component providing the suspension system with compliant behaviour according to the present invention.

The assembly can be thought of as an "add-on" module to an already-known simple, inexpensive type of suspension, which endows the suspension system with a preferred compliant behaviour, that is, a controlled deflection under certain loads. The resulting compliant behaviour may be considered equivalent to that exhibited by more complex and expensive multi-link suspension systems.

The module may be located inside the wheel and may be considered as, in effect, a compliant interface between the wheel carrier and the basic suspension system linkage itself.

Figure 4:
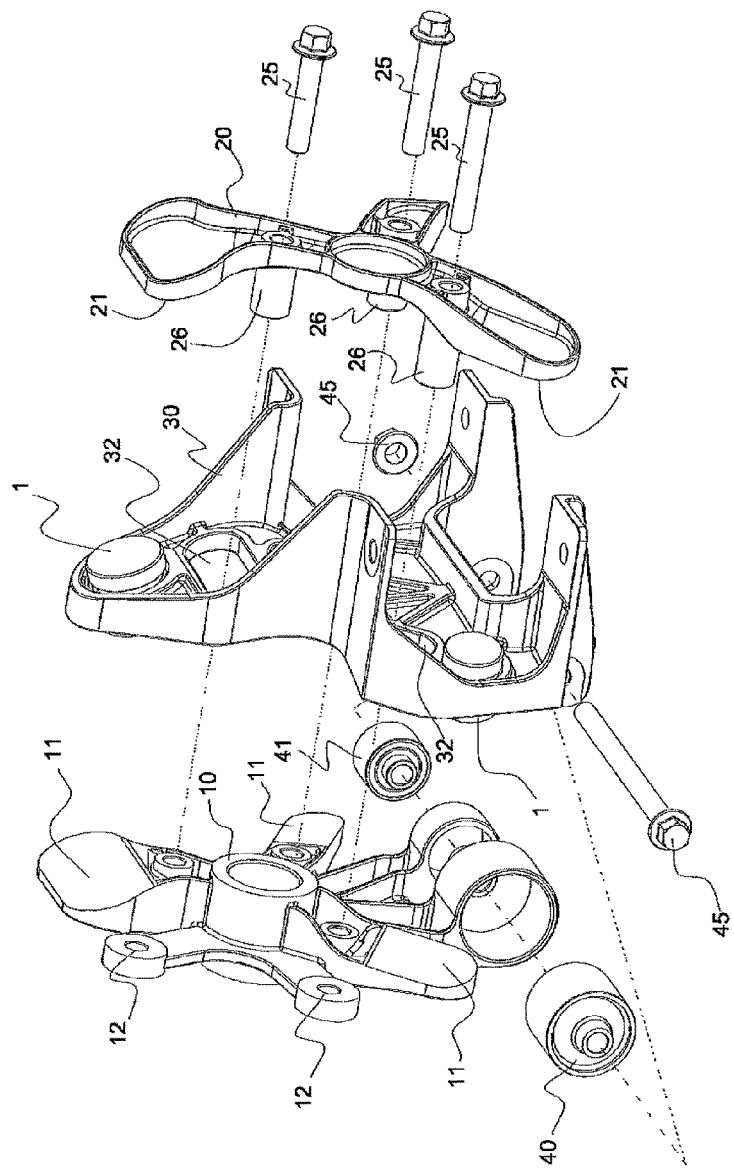
FIG. 4 is an exploded view of one embodiment of the vehicle suspension component according to the present invention.

FIG. 4 is an exploded view of the embodiment according to the preceding FIGS. 1-3. Numeral 32 refers to holes or apertures arranged in the support 30. The holes or apertures 32 is adapted to allow the connecting means 25, together with corresponding spacers 26, which may form part of one or more of the neighbouring components, to pass through the support 30 such that the hub carrier 10 may be connected to the bracket or back-plate 20 through the support 30. The size of the holes or apertures 32 should be sufficient in order to provide unrestricted movement of the connecting means 25 incl. the spacers 26, within a predetermined range of deflection.

Figure 5:
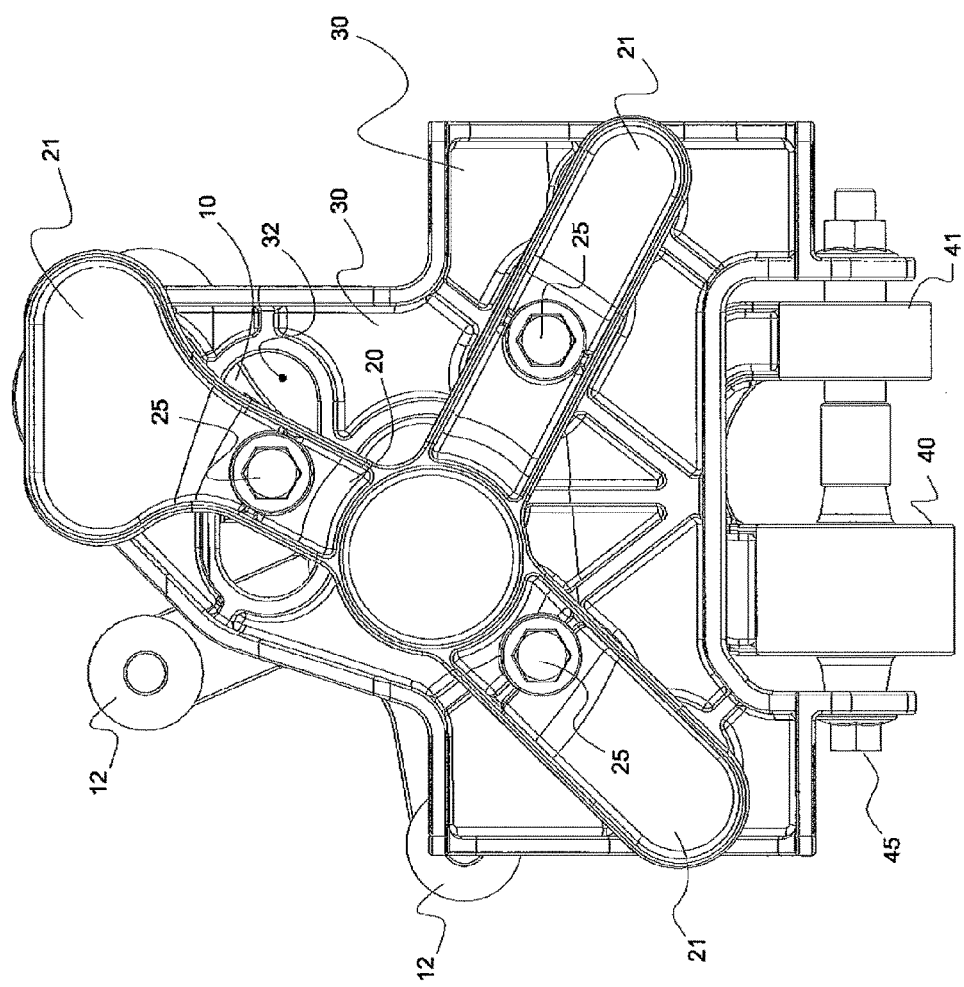
FIG. 5 is a plane view of the component according to FIG. 4, however in a compiled state and seen from inside the confines of the vehicle in a direction transverse to the longitudinal axis of the vehicle.

FIG. 5 is a plane view of the component according to FIG. 4, however here shown in a compiled state and seen from inside the confines of the not shown vehicle in a direction transverse to the vehicles longitudinal axis.

Figure 6:
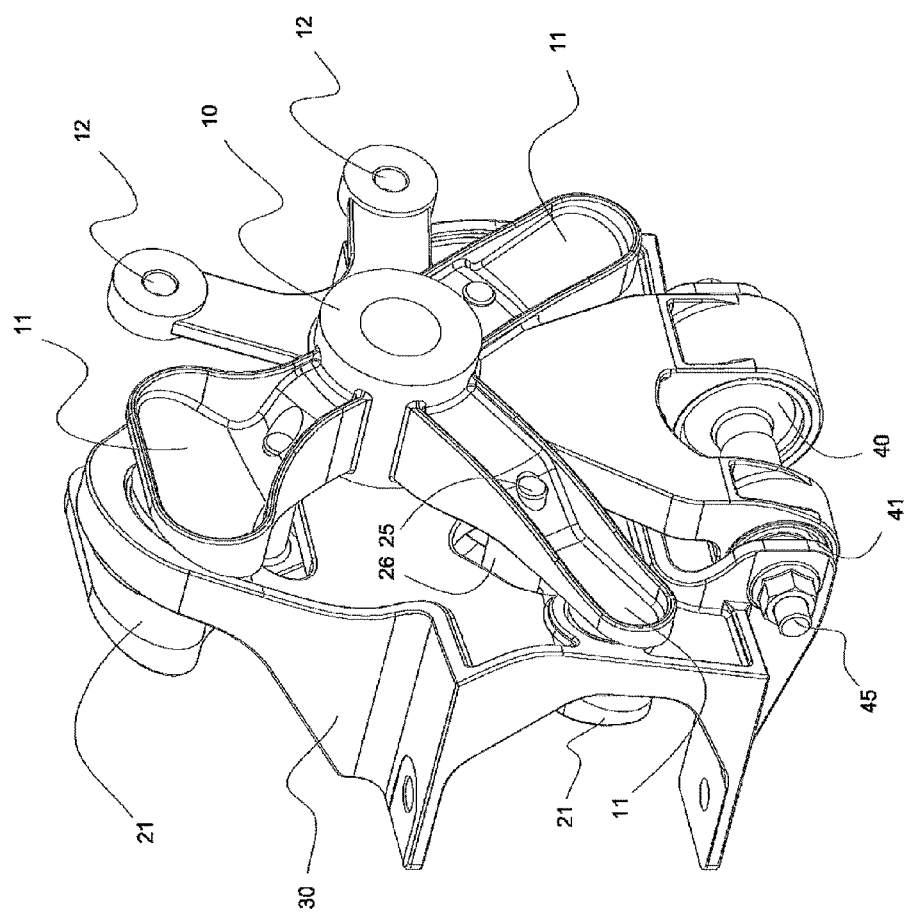
FIG. 6 is a perspective view of the component according to FIG. 4, however in a compiled state and seen from outside the vehicle.

FIG. 6 is a perspective view of the component according to FIGS. 4 and 5, here shown in a compiled state and seen from outside the confines of the vehicle.

The function of the two rubber bushings 40, 41, as per the embodiment as illustrated within the preceding figures, can be incorporated into a single bushing having a particular form according to the stiffness properties required. Such an embodiment may result in a cleaner and/or simpler component or assembly.

Figure 7:
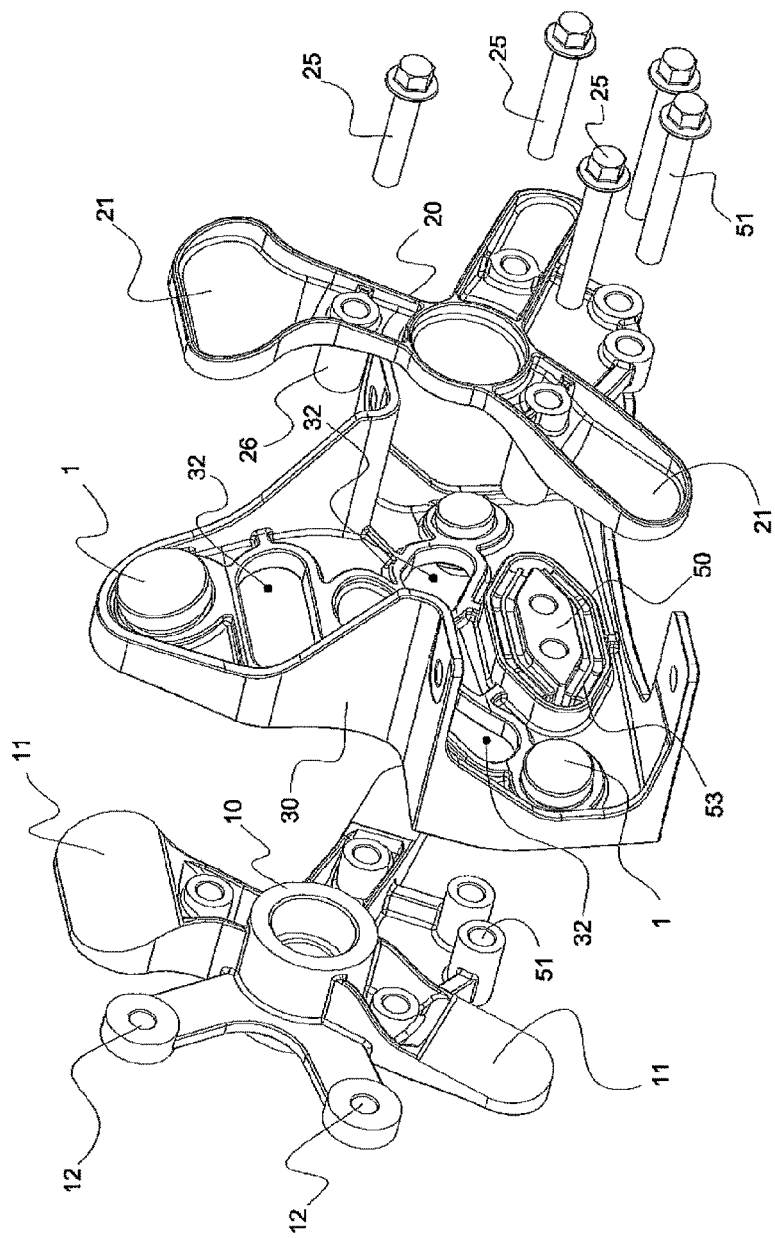
FIG. 7 is an exploded view of one embodiment of the vehicle suspension component according to the present invention.

FIG. 7 is an exploded view of one embodiment of the vehicle suspension component according to the present invention. As can be seen in the figure, the two bushings 40, 41 as illustrated throughout the preceding figures, are in this embodiment omitted and replaced by a dedicated bush 50 provided within the support 30. The bush 50 may constitute an assembly of flexible or compliant as well as rigid components.

Although not shown in the figures, it will, in another embodiment, be possible to construct an assembly wherein the bushings 40, 41 cooperate with the bushing 50.

As can be seen in FIG. 7, the bush 50 may encompass means ensuring specific compliant characteristics, which is illustrated by numeral 53, which refers to steel interleafs or similar.

The bracket or back-plate 20 is connected to the hub carrier 10 through the support 30 and the bush 50 by means of connection means 51, which may constitute bolts 25 or equivalent.

Figure 8:
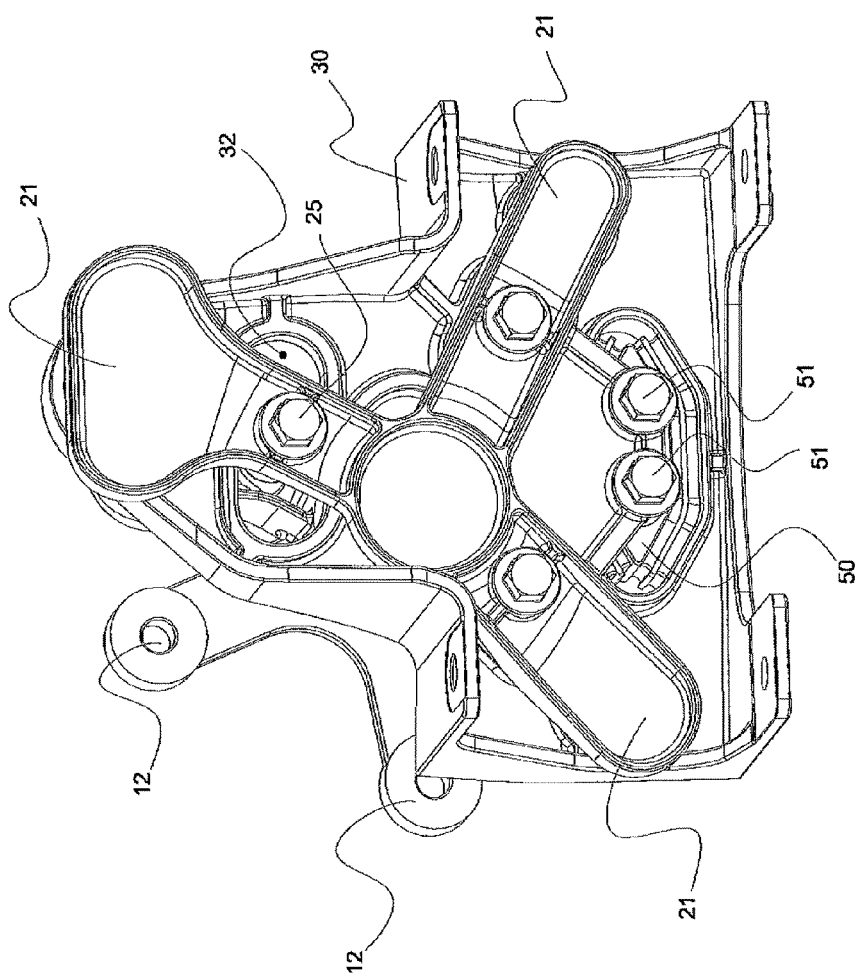
FIG. 8 is a perspective view of the component according to FIG. 7, however in a compiled state and seen from inside the vehicle in a direction substantially transverse to the longitudinal axis of the vehicle.

FIG. 8 is a perspective view of the component or assembly according to FIG. 7, however here shown in a compiled state and seen from inside the confines of the not shown vehicle and in a direction substantially transverse to the longitudinal axis of the vehicle.

Figure 9:
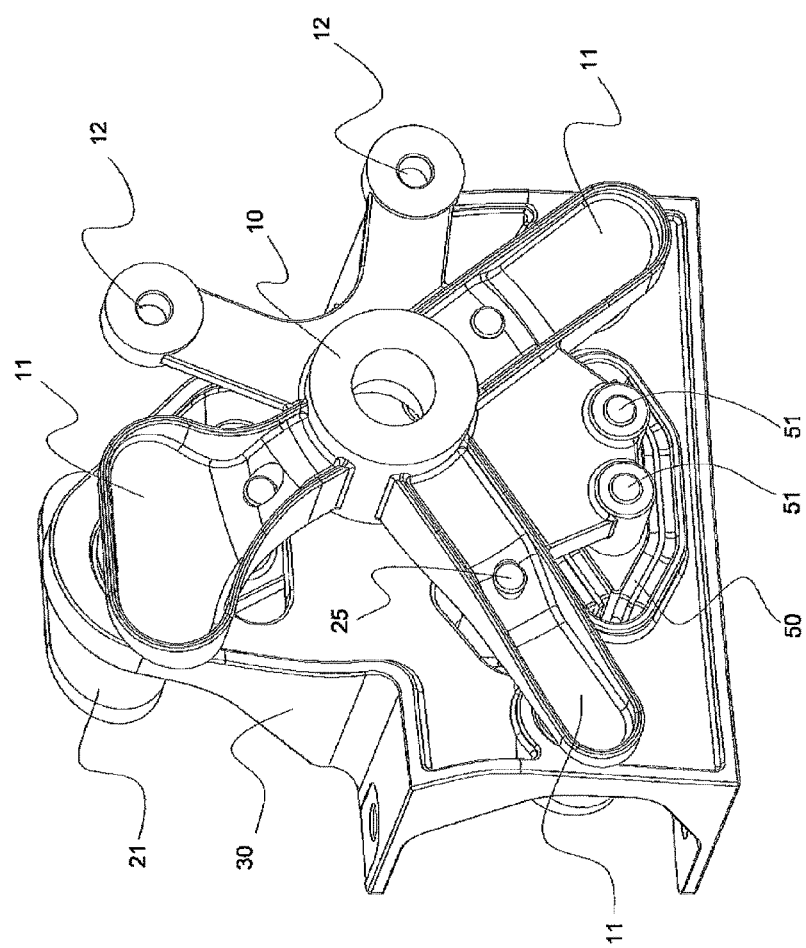
FIG. 9 is a perspective view of the component according to FIG. 7, however here shown in a compiled state seen from outside the vehicle in a direction substantially transverse to the longitudinal axis of the vehicle.

FIG. 9 is a perspective view of the component according to FIGS. 7 and 8, however here shown in a compiled state and seen from outside the confines of the vehicle in a direction substantially transverse to the longitudinal axis of the vehicle.

Figure 10:
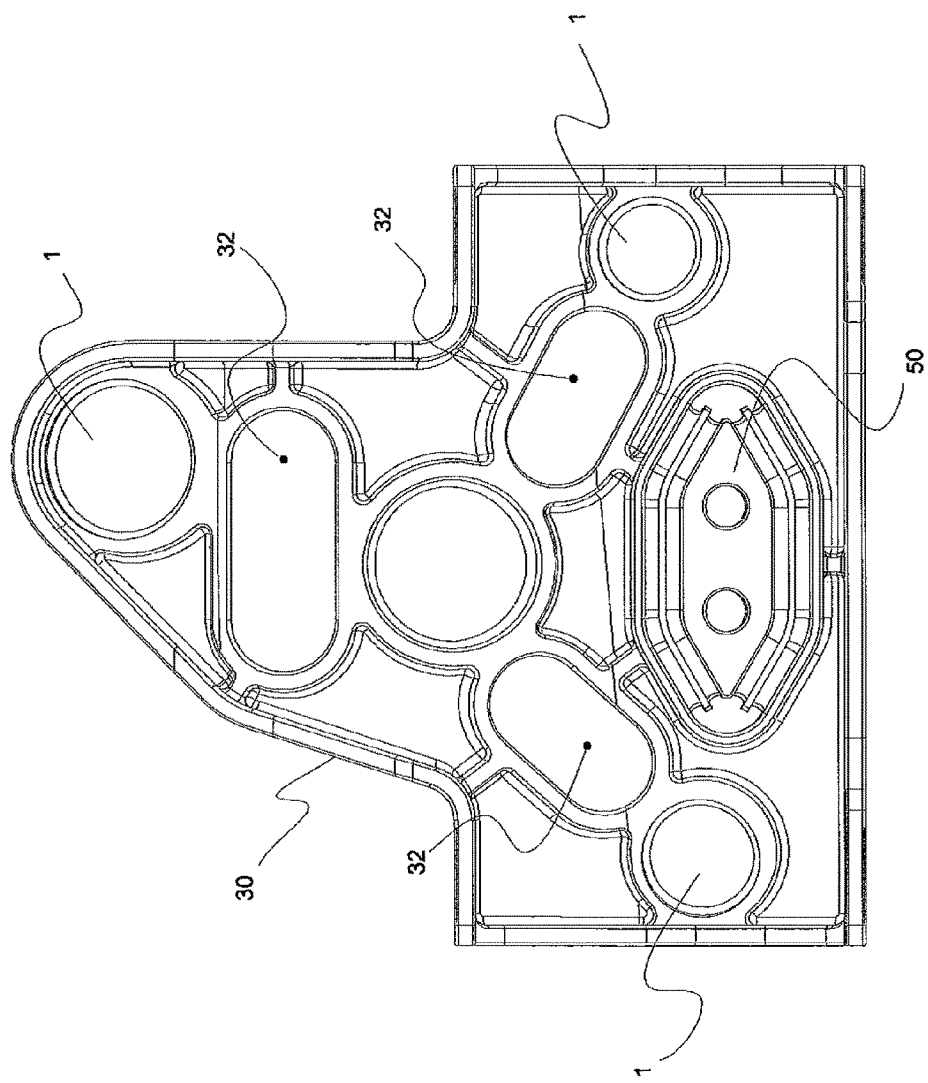
FIG. 10 is a plane view of a part of a component according to FIG. 7.

FIG. 10 is a plane view of a part of the support 30 according to FIG. 7.

Figure 11:
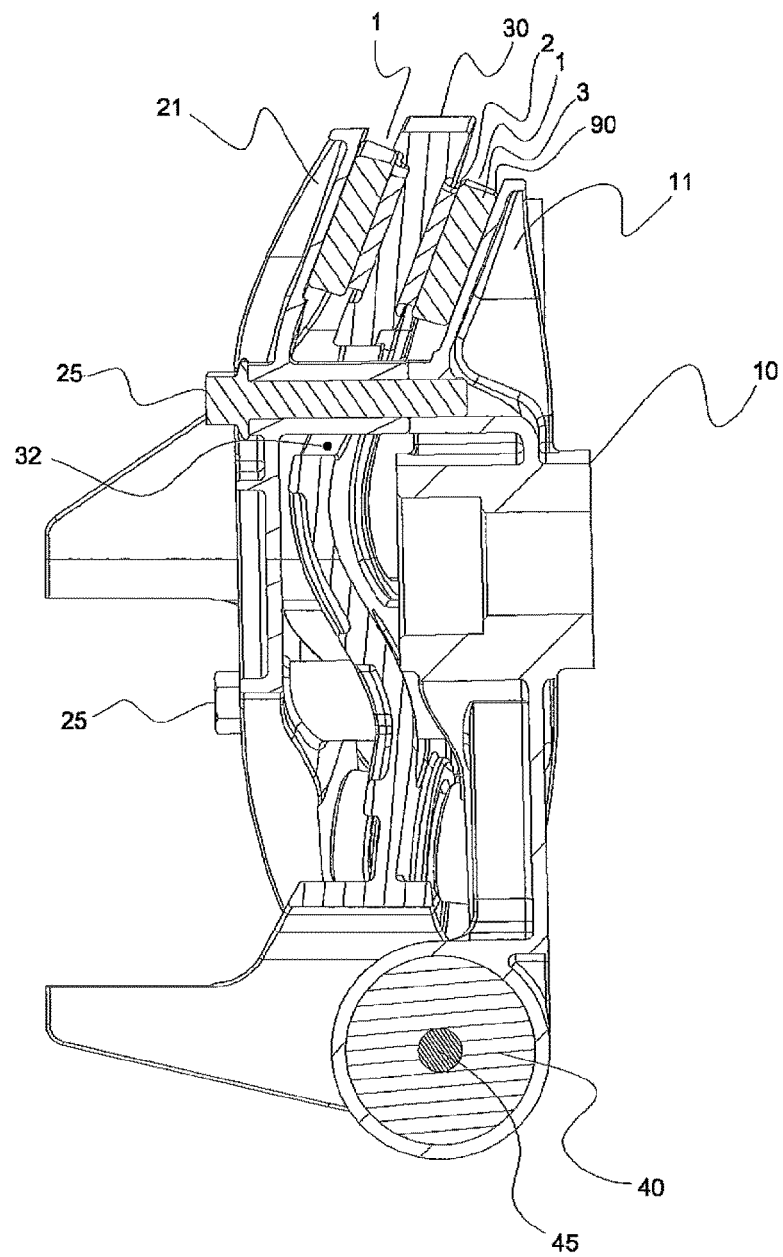
FIG. 11 is a sectional view of a component or assembly according to the present invention.

FIG. 11 is a sectional view of the component or assembly under an embodiment according to the FIGS. 1-6. The figure illustrates a substantially transverse and vertical section through a centreline of a wheel (not shown).

The section cuts through the support portions 11 and 21 of the hub carrier 10 and the bracket or back-plate 20.

As per the above, the suspension system according to one aspect of the present invention, takes the form of a component or assembly which is fixed rigidly to a base suspension linkage 100.

As can be seen in the figures, the hub carrier 10 provides a rigid mounting for a stub axle which in turn supports a not shown wheel bearing.

Although a stub axle/bearing construction is used in the illustrated embodiments, the suspension system according to the present invention will be equally beneficial under embodiments in a flanged hub unit, wherein the bearing inner part possesses a flange that allows the bearing to be mounted directly to the hub carrier without a stub axle, and wherein the bearing outer part is integrated with the wheel carrier part and therefore mounted directly to the brake disc and wheel.

The illustrated embodiments encompass various elastic elements or bushes interposed between the components.

According to the above exposition, the component or assembly according to the present invention may constitute a plurality of support bodies 1. As illustrated throughout the figures, the support 30 accommodates a total of six support bodies 1, three on one side facing the interior of the vehicle and three facing away from the interior and the vehicle.

As can be seen in FIG. 11, the support bodies 1 may, according to one embodiment, constitute two parts, an elastomer or rubber part 2 and a part or portion 3 adapted to, together with the surfaces of the outer portions 11, 21, provide a sliding interface 90 between the support portions 11, 21 and the portion 3, such that desired compliant behaviour of the hub carrier 10 with respect to the support 30 is achieved.

According to one embodiment, the portion 3 constitutes a sliding portion which may constitute a block of bearing material or equivalent possessing low friction and low wear characteristics upon the portion being in contact with the outer portions 11, 21. The sliding portion or block 3 may be made up from materials like plastics incl. nylon and glass fibre, metallic alloys or even carbon fibres and the like incl. components thereof.

The portion 3 may be rigidly connected or bonded to the rubber parts 2, e.g. by means of mechanical interconnection or by means of gluing or equivalent.

The sliding portions 3 are in sliding contact with faces provided in the region of the outer portions 11, 21 of the hub carrier 10 and the bracket or back-plate 20, whilst the rubber parts 2 are themselves connected to the support 30.

The pad/slider arrangements, i.e. the sliding interfaces 90, may be placed in opposition to one another, and the outer portions 11, 21 of the hub carrier 10 and the bracket or back-plate 20 may be designed such that the support bodies 1, 2, 3 receive an axial preload, e.g. by means of the means 25 or equivalent, which is oriented substantially normal to the surfaces of the sliding interface 90, upon assembly of the components, that is sufficient to prevent separation of the components.

A not illustrated embodiment may encompass means for selectively setting and/or applying the magnitude of the axial preload. Such means may at convenience constitute means being able to dynamically alter the preload whereby the overall characteristics and performance of the suspension system to which the present invention is applied may be modified.

The purpose or effect of each support body 1, 2, 3 is to introduce a compliant connection between the support 30 and the hub carrier 10 or, depending on the embodiment, the component or assembly composed of the bracket and/or back-plate 20 and the hub carrier 10.

The compliant connection has a translational stiffness in the axial direction of the support bodies 1, 2, 3, while the support bodies 1, 2, 3 are free to move in directions orthogonal or normal to axes defined by the support bodies.

The dimensions and properties of the elastomer or rubber part 2 incl. the sliding portion 3 may be selected such that the translational stiffness and load-bearing capacity required by the functional specification for the system is achieved.

The support bodies 1, 2, 3 may be designed to exhibit high translational stiffness in one direction, and low translational stiffness in directions normal to the first direction.

During operation of the suspension system according to the present invention, the support bodies 1, 2, 3 are subject to displacements in their flexible directions.

Although the abovementioned embodiments all suggest a plurality of sliding interfaces 90, generally made up from a pad/slider arrangement such as sliding bearings and sliding surfaces defined by abutting components, this may, as will be clear from below expositions, not in any way be considered as limiting to the vehicle suspension system according to the present invention.

The components used to realise a "theoretical elastic concept" as per the present invention may take many forms, and the fundamental force/displacement properties of the support bodies can be reproduced in many ways.

The invention may equally be furnished with components providing substantially similar behaviour, i.e. components showing substantially similar force/displacement properties. Such alternatives may include, but is not limited to: rolling balls, flexible or not, small links incl. wires etc., hollow chambers which may be filled with a fluid or not, rubber blocks or bushings with or without interleafs, blades or even wires.

Under certain embodiments, the support bodies may be configured with one or more predetermined first rigidities in first directions 110, 120, 130 with respect to the support 30, and second rigidities in directions normal to the first directions 110, 120, 130 with respect to the support 30. The second rigidities may be substantially less than the first rigidities.

Under embodiments wherein sliding bearings are applied to the suspension system, the second rigidities may be zero or close to zero.

Under embodiments wherein parts of the support bodies are fixed, i.e. possesses a substantially permanent contact patch unto the components to which they connect, which, according to the selected embodiment, typically will be the outer portions 11, 21 or the hub carrier 10 and the bracket or back-plate 20, may not require a back-to-back arrangement as suggested above and realised inter alia by means of the means 25 and 26 etc., and an axial preload to prevent separation. The back-to-back arrangement may however still be desirable for other reasons; one example may be that rubber is more durable if it is not required to work in tension.

Under embodiments wherein the illustrated support bodies includes sliding bearings, the rubber pads may equally be connected or bonded to the hub carrier 10 and the bracket or back-plate 20 respectively, whereby sliding interfaces are established between the support bodies 1 and the support 30.

The structural flexibility of the bracket or back-plate 20, and to some extent the remaining components of the assembly, may provide a significant contribution to the translational stiffness of the centre of the projected "virtual ball joint" in comparison and/or addition to the axial stiffness of the support bodies.

The above described support bodies theoretically, and to some extent, converge on a single point, however any minor error or deviation will only have minimal effect on the function of the system.

Although the embodiment presented makes use of three support bodies provided on each side of the support 30, in order to create a virtual centre of stiffness, there is no theoretical obstacle in using an alternative number of support bodies. The projection of the virtual centre of stiffness may become more effective under embodiments wherein a higher number of support bodies are provided.

Further, and not illustrated within the figures, it will be possible to provide different numbers of support bodies on each side of the support 30, e.g. four support bodies 1 abutting the hub carrier 10 and five abutting the bracket or back-plate 20, resulting in the support bodies 1 not being arranged in opposition.

It will, according to another not illustrated embodiment of the present invention, be possible to arrange the support bodies 1 directly on the base suspension 100 which will lead to a lighter and more cost efficient system as the support 30 will form an integrated part of the base suspension 100.

According to the above described embodiments, the bracket or back-plate 20 and the hub carrier 10 each comprise 3 outer portions 11, 21, each being in operational contact with the support bodies 1, 2, 3 resulting in an assembly or component comprising a total of six support bodies 1, 2, 3.

The elastomer or rubber part 2 of the support body 1 may be rigidly mounted or fixed to the support 30, e.g. by means of bonding, screwing or riveting or equivalent. Further, the support bodies 1, 2, 3 may be arranged into and/or onto the support 30 by means of press fitting and the like.

Although the above exposition suggests only three outer portions 11, 21 of the hub carrier 10 and the bracket or back-plate 20 respectively, this is not in any way essential for the performance of the suspension system according to the present invention. The invention may work equally well under embodiments encompassing an alternative number of outer portions 11, 21 of the hub carrier 10 and the bracket or back-plate 20 respectively. Under embodiments encompassing e.g. 4 outer portions (not shown) of the hub carrier 10 and the bracket or back-plate 20 respectively, the support bodies 1, 2, 3 may of course be provided accordingly.

According to another not shown embodiment of the present invention, the support bodies 1 may extend toward one another and/or be merged to create a single large support body, optionally with spherical contact surfaces creating a "knuckle-joint". Such "back-to-back" layout may prevent separation of the possible contact surfaces under load.

Figure 12:
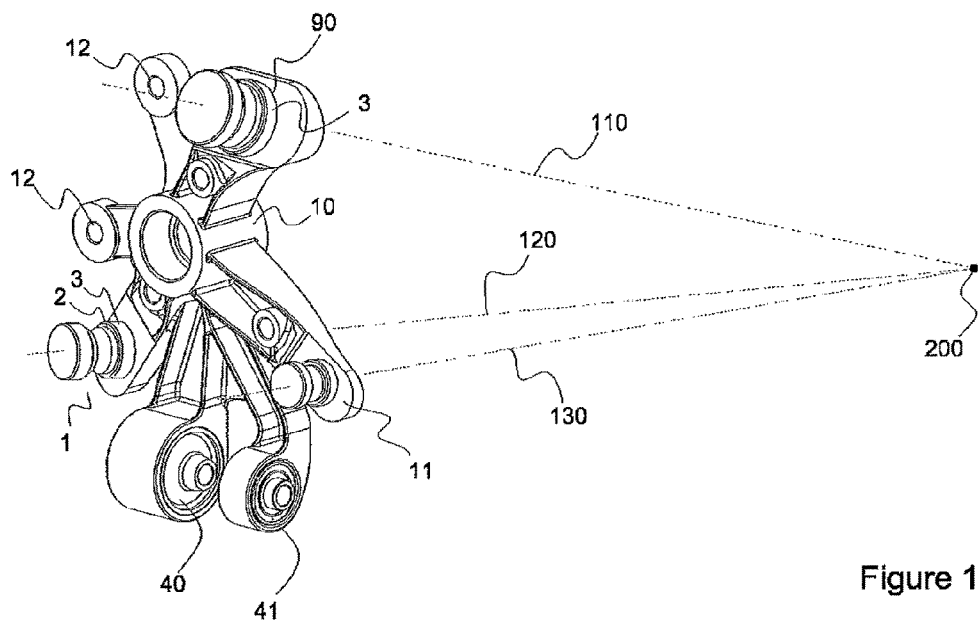
FIG. 12 is a perspective view of a part of a component or assembly according to one embodiment of the present invention.

FIG. 12 is a perspective view of a hub carrier 10 incl. support bodies 1, 2, 3, according to one embodiment of the present invention. The remaining components of the assembly or component are in this figure, for illustrative purposes, removed.

As per the above, the sliding interfaces 90, established between the support portions 11 on the hub carrier 10 and the support portions 21 on the not shown bracket or back-plate 20, provides the compliant behaviour according to the present invention. As shown in FIG. 12, each sliding interface 90 is on one hand defined by a substantially plane surface of the outer portion 11 and a substantially plane surface of the portion 3 of the support body 1.

The lines 110, 120 and 130 constitute theoretical lines oriented normal to the surfaces of the sliding interfaces 90. As can be seen, the lines converge, due to the orientation of the components establishing the sliding interfaces 90, at a point or region 200. The point or region 200 may lie outside the confines of the not shown vehicle.

Given that the support bodies 1, 2, 3 allow movement, possibly relative to the support 30, of the hub carrier 10 and the bracket or back-plate 20 at their locations in directions tangential to the point 200, the effect of the support bodies 1, 2, 3 is to create a virtual ball joint between the components 10, 20 and the support 30 that possesses its centre at the convergence of the three axial directions 110, 120, 130.

As per the above, the component or assembly according to the present invention is capable of exhibiting the compliant characteristics, with the exception of large vertical displacements, of a multi-link suspension system.

Mounting the component or assembly on a basic suspension architecture, such as a twist beam axle, will result in a total system performance equivalent to that of a multi-link suspension.

As per the introductory part of this specification, the difference in production cost of a twist beam suspension and even the most simple multi-link suspension is such that, after the additional cost of the component or assembly according to the present invention has been added to that of the twist beam axle, significant savings are still possible in comparison to a multi-link system of comparable compliant performance.

A modern suspension compliance specification requires that the suspension exhibit several important stiffness characteristics. Although specifications vary from car to car, generalisations can be made, some of which are listed below:

A. High camber angle stiffness during cornering, (lateral forces at tyre contact patch)
B. High lateral (translational) stiffness at the tyre contact patch during cornering,
C. Toe-in during braking, (rearward longitudinal forces at the tyre contact patch)
D. Low fore/aft stiffness for "comfort" forces. (longitudinal forces at the wheel centre)

Requirements A) to C) are concerned with vehicle stability and handling response, while requirement d) is related to comfort and the suspension's ability to absorb irregularities in the road surface.

The specific reasons for these characteristics are considered to lie beyond the scope of this specification.

As per the above, the component or assembly according to the present invention creates an elastic mechanism that is directly comparable with the specification of a multilink system.

The elastic mechanism is resulting from the component or assembly described herein consisting of a plurality of compliant connections between the base suspension 100 and the hub carrier 10, each having a specific combination of translational stiffness.

Figure 13:
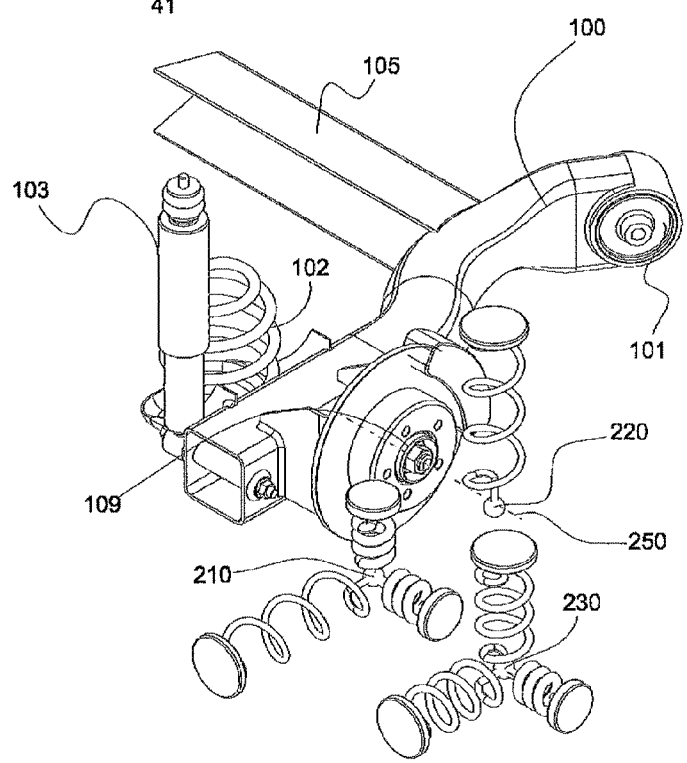
FIG. 13 is a perspective view of a part of a rear suspension principally illustrating an elastic mechanism.

FIG. 13 is a perspective view of a part of a rear suspension principally illustrating an elastic mechanism.

The points 210 and 220 lie approximately within an envelope of a not shown wheel; point 210 is located behind the wheel centre 250 and point 220 is located forward point 210.

It should be noted that the illustrated springs associated with the points 210, 220 and 230 does not form part of the suspension system and are shown for illustrative purposes only.

The elastic mechanism may typically constitute a simple, and to some extent theoretical, compliant mechanism capable of meeting a compliant specification equivalent to a specification for a multilink suspension system.

Point 230 has a longitudinal location similar to that of point 210, but it lies substantially outside of the confines of the not shown vehicle, which renders the mechanism impractical in the "pure" form illustrated in the figure by means of the springs imposed on the points 210, 220, 230.

At each point 210, 220, 230, the elastic connection between the base suspension 100 and the wheel carrier 109 has a specific set of translational stiffness properties. The properties vary, as do the precise locations of the points 210, 220, 230, according to the desired contents of the compliance specification.

Toe-in or toe-out behaviour during cornering can be created by offsetting points 210 and 230 respectively behind or in front of a wheel centre/tyre contact patch. In this case the longitudinal offset between the applied cornering forces and the lateral reactions at points 210 and 230 will generate equal and opposite longitudinal forces at the two points 210, 230.

The longitudinal deflections that result equate to the required or desired toe-in or toe-out angle change.

Under braking forces, the longitudinal reactions at points 210 and 230 are governed by their lateral offset from the braking force itself. There is a greater reaction force at point 210 therefore, and this combined with a lower longitudinal stiffness, this means that point 210 deflects more than point 230 in a longitudinal sense. This equates to toe-in, and so satisfies compliance requirement C) mentioned earlier in this specification.

A low longitudinal stiffness at the wheel centre 250 specified by compliance requirement D) is achieved by a vertical offset between the longitudinal reactions at points 210 and 230 and the applied longitudinal force at the wheel centre 250 results in vertical reactions at all three points 210, 220, 230.

The point 220 has a very low vertical stiffness in comparison to those at points 210 and 230 and as a result, the hub carrier 10 has a tendency to rotate around an axis passing through points 210 and 230 in response to longitudinal forces at the wheel centre. This is the mechanism with which the low fore/aft stiffness of the suspension at the wheel centre is achieved.

Upon the component or assembly being subject to vertical forces, the majority of vertical force reaction takes place at point 210, as there is little offset distance with respect to the wheel centre. Point 210 has a high vertical stiffness, and therefore the elastic mechanism as a whole introduces very little vertical compliance at the wheel centre as required.

The elastic mechanism composed of the three connections, each having predetermined locations and properties of stiffness, is therefore able to meet a specification of compliance equivalent to a specification of compliance of a multi link suspension system.

Points 210 and 220 of the theoretical mechanism described above lie substantially inside the not shown wheel envelope and as such, the points can be physically realised without much difficulty.

Point 230 on the other hand cannot be immediately physically realised, which is why the point 230, according to one aspect of the present invention, is realised virtually.

In other words, an elastic system must be employed which creates substantially identical behaviour to that exhibited by point 230, but without being physically present at its illustrated location.

Virtual centres of stiffness are common in suspension linkage design. The centres of stiffness are typically created using the convergence of links, but can also be generated using elastic components exhibiting a high ratio of axial to shear stiffness.

A convergence point of the link axes is also the point of maximum translational stiffness and minimum rotational stiffness between the two bodies.

Any relative translation of the components at the point of convergence would require one or both of the links to change its length; i.e. either stretch or compress.

If rigid links are used, the virtual ball joint created possesses, in theory at least, an infinite translational stiffness.

Instead of links, a pair of rigid rollers or equivalent may connect the two bodies. On each body, the rollers or equivalent roll along circular surfaces each has its centre at the desired location of the virtual ball joint. Once again, providing the rollers are stiff in the direction perpendicular to the contact surface but perfectly free to roll along it, the two bodies are free to rotate relative to one another around the virtual ball joint, but have extremely high translational stiffness between them at that point.

If however, a virtual centre of rotation/stiffness is required, but one which does not have infinite translational stiffness, then the system may be modified as per one embodiment of the present invention.

By mounting the rollers or equivalent on springs aligned towards the desired centre of stiffness, the translational stiffness at the virtual ball joint location is no longer infinite, although the rotational freedom around the point remains unchanged.

It should be noted that the abovementioned rollers or equivalent implies a 2-dimensional system while three converging sets of rollers implies a 3-dimensional compliant system.

The examples above will demonstrate satisfactory performance and the three converging sets of rollers or equivalent may be required to fully constrain a virtual spherical joint.

The properties of the roller(s) or equivalent may be reproduced in practice by using a low-friction sliding block or similar as already described, where the block may be mounted on a rubber pad to provide the required compliance. In service, any supplied support body or bodies will be required to resist axial compressive and axial tensile forces, and as sliding elements are generally intolerant of intermittent contact conditions it is necessary for each element to consist of a pair of rubber-mounted sliders placed back-to-back and under a compressive preload. Provided the already mentioned compressive preload is greater than the maximum axial loading experienced by the support body in either direction, separation will not occur in service.

In the embodiment described above, the support bodies 1, 2, 3 may be bonded to the support 30 and slide on the outer portions 11, 21, which may constitute specially machined pads on the hub carrier 10 and the bracket or back-plate 20 respectively.

In this way, provided that their stiffness and geometry/orientation are carefully selected, the three support bodies 1, 2, 3, provided on each side of the support 30, are able to reproduce the stiffness behaviour required at point 230.

As mentioned earlier, common rubber bushings can be used to reproduce the requirements of points 210 and 220.

The elastic elements of the present invention therefore allow it to mimic the theoretical elastic mechanism, and in doing so, satisfy all the requirements of the suspension's compliance specification.

Figure 14:
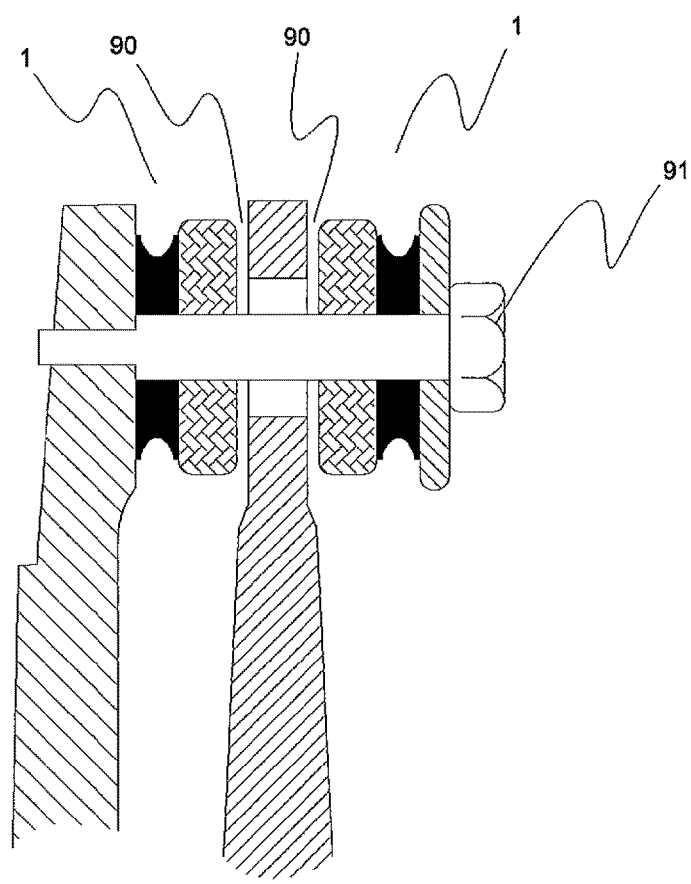
FIG. 14 is a sectional view through a part of a component or assembly according to one embodiment of the present invention.
Figure 15:
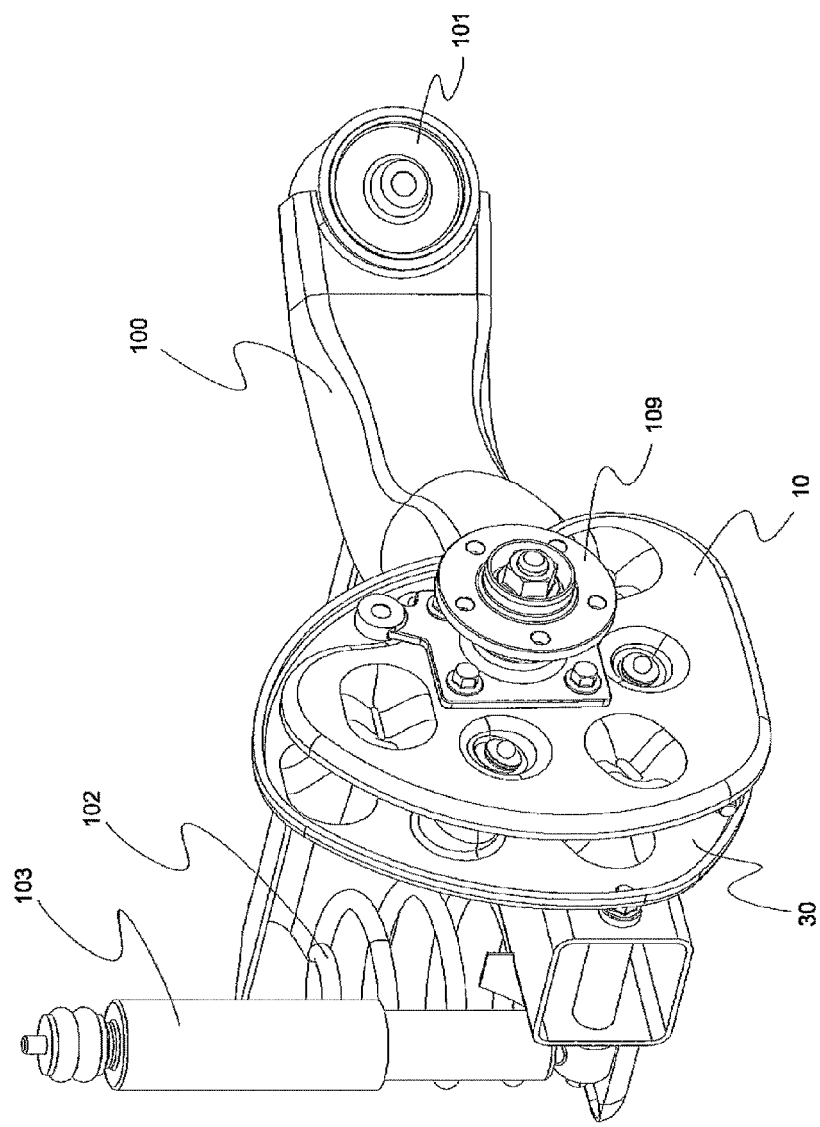
FIG. 15 is a perspective view of a part of a vehicle suspension provided with a compliant system according to one embodiment of the present invention.
Figure 16:
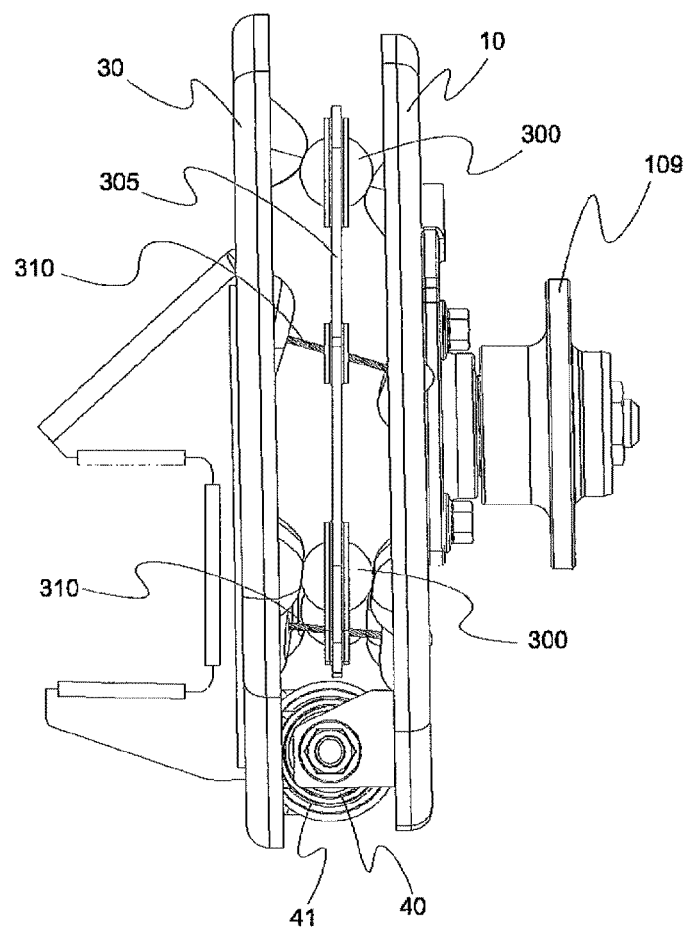
FIG. 16 is an end view of a compliant system according to one embodiment of the present invention.
Figure 17:
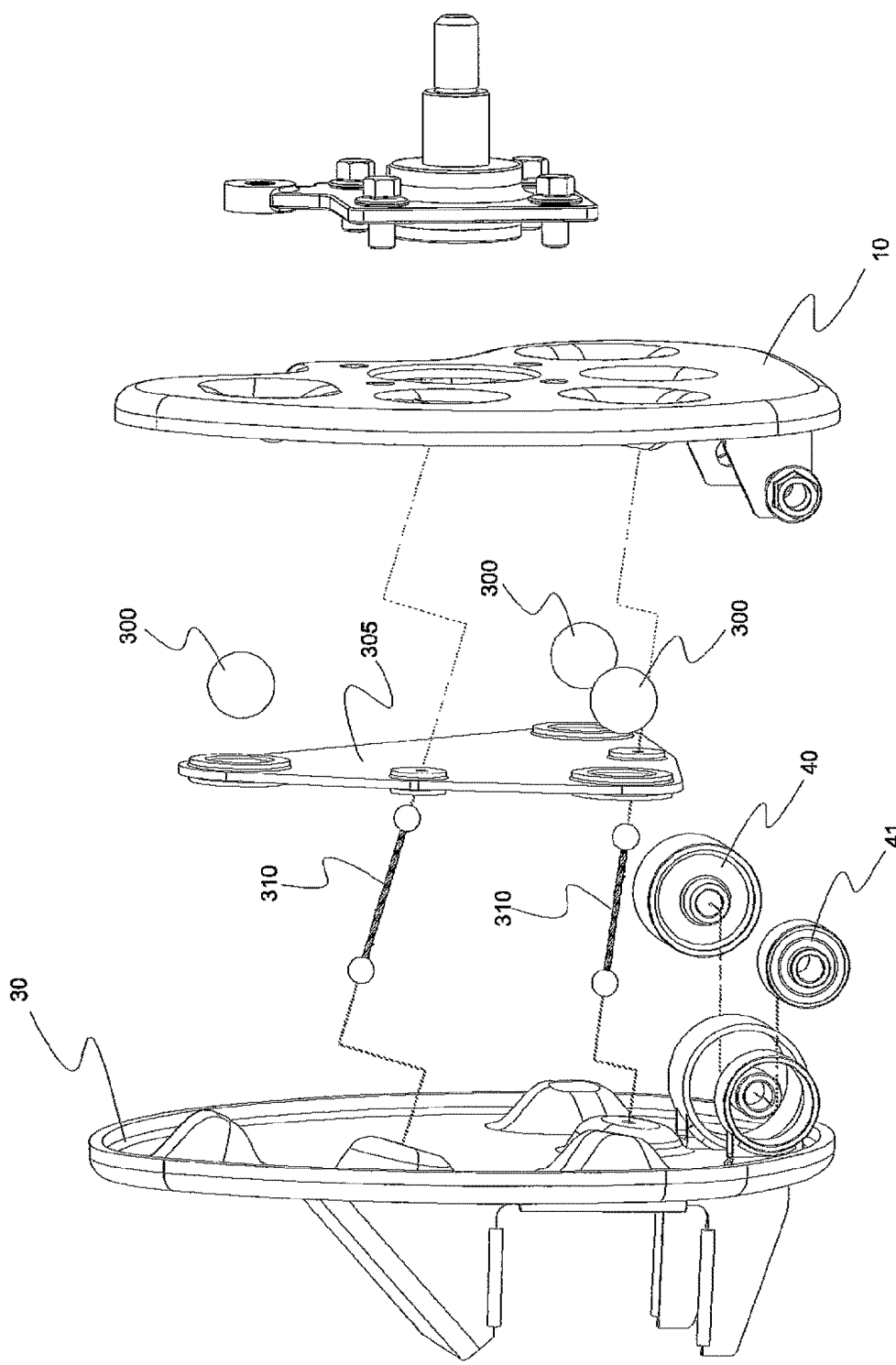
FIG. 17 is an exploded view of the compliant system according to FIG. 16.
Figure 18:
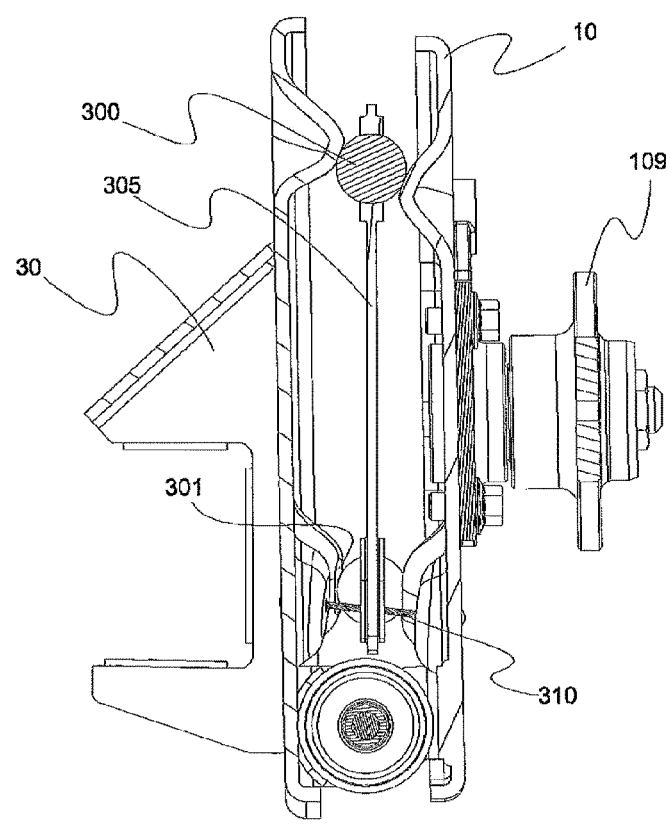
FIG. 18 is a sectional view through the compliant system according to FIG. 16.

FIG. 14 shows a sectional view through a part of a component or assembly according to one embodiment of the present invention. As can be seen in the figure, the sliding interface 90, inter alia defined by the support bodies 1 being under compressive tension by means of a screw or equivalent 91, may be established without applying a back plate to the system, such as shown in the foregoing figures, whereby an even simpler and less space demanding compliant system may be provided. The embodiment according to FIG. 14 may be applied to arbitrary embodiments of the present invention.

FIGS. 15-19 shows different views of another embodiment or variant according to the present invention. As can be seen in the figures, relative movement between support 30 and hub carrier 10 is achieved by means of rolling spheres 300 or equivalent.

The compliant system according to the FIGS. 15-19, are provided with at least three support bodies 300, which may take the form of spheres or rolls.

The spheres 300 roll on surfaces that lie tangentially to the shear centre of the system.

The spheres 300 or equivalent are brought under compressive preload in order to maintain a preferred rolling contact between the spheres 300 and the hub carrier 10 and the support 30.

In order to generate the correct translational stiffness at the shear centre, it may be preferred that the spheres are non-rigid; constructed of plastic, rubber-coated steel or similar.

Figure 19:
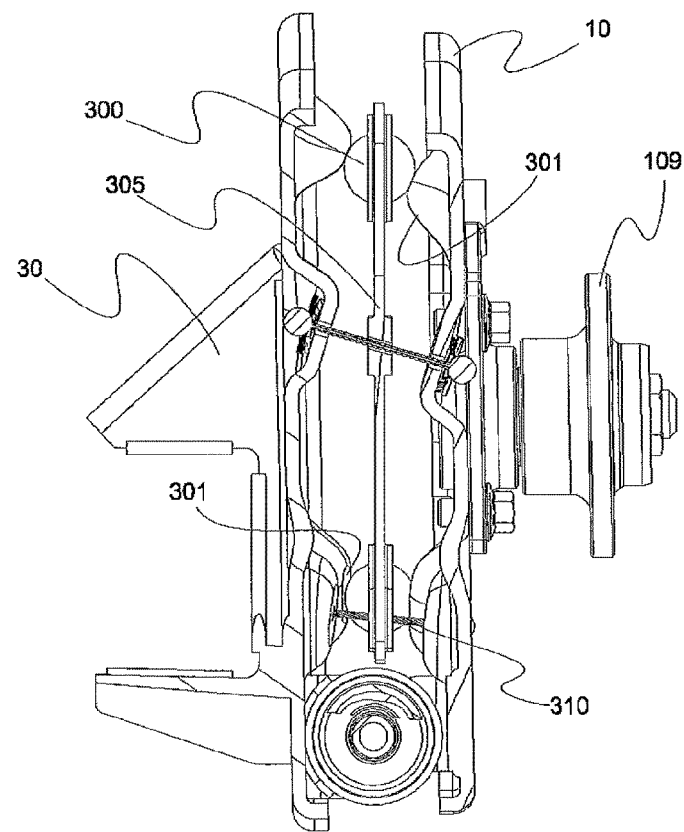
FIG. 19 is a sectional view through the compliant system according to FIG. 16.
Figure 20:
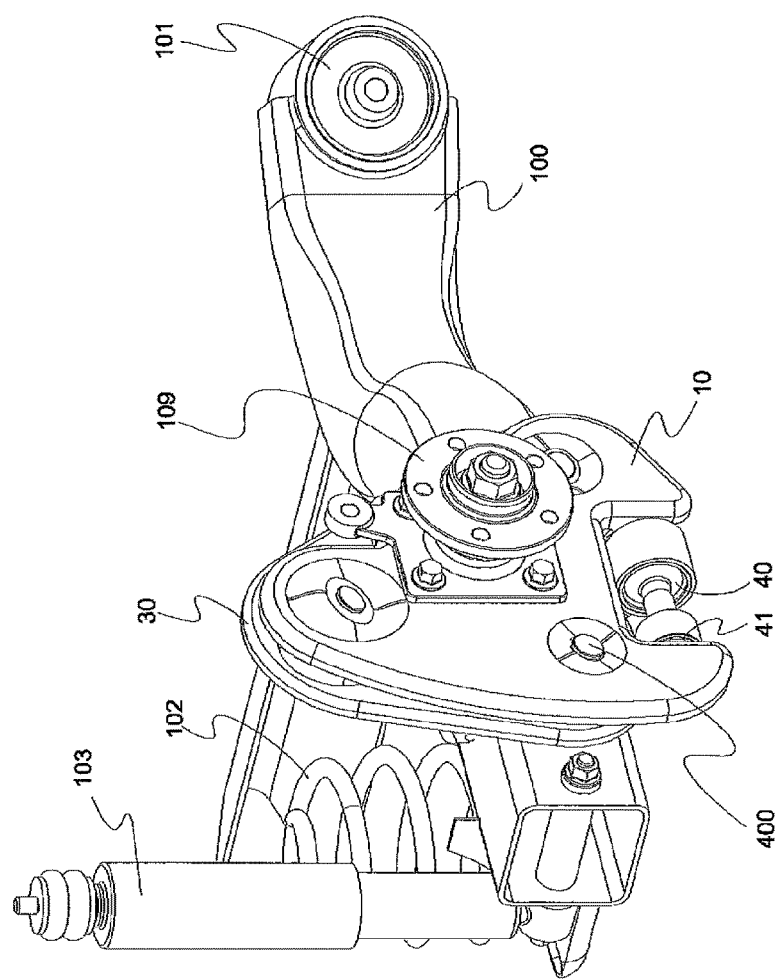
FIG. 20 is a perspective view of a part of a vehicle suspension provided with a compliant system according to one embodiment of the present invention.
Figure 21:
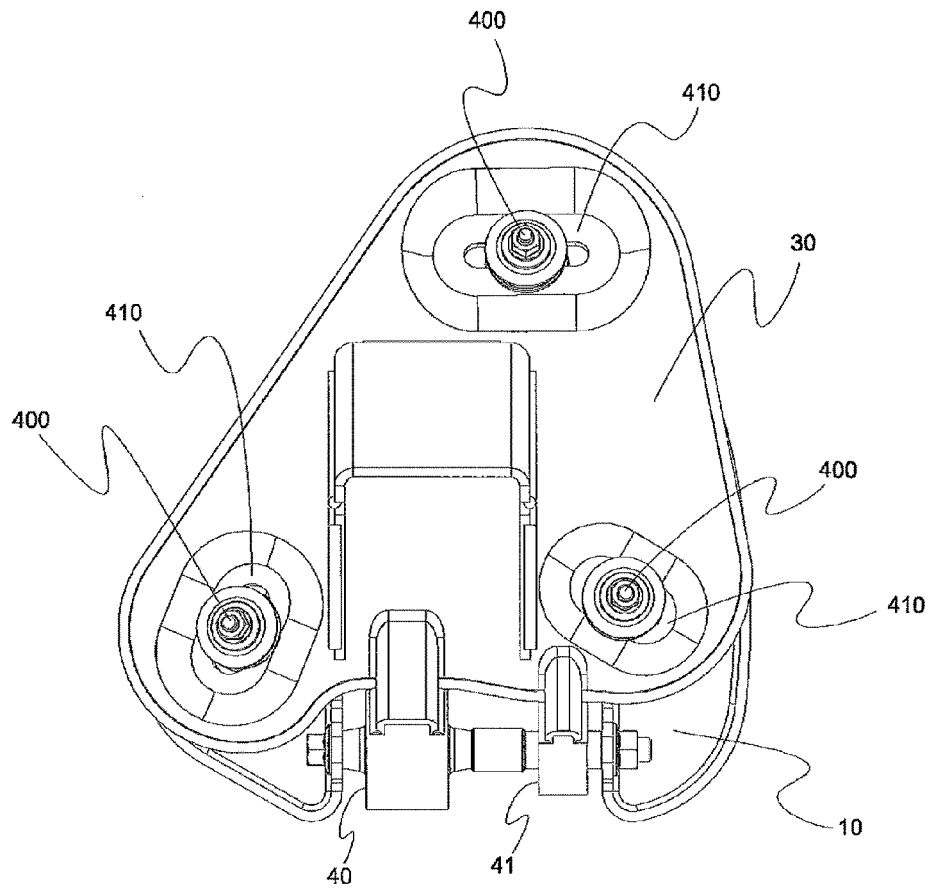
FIG. 21 is a plane view, seen from inside the confines of a not shown vehicle, of a compliant system according to one embodiment of the present invention.
Figure 22:
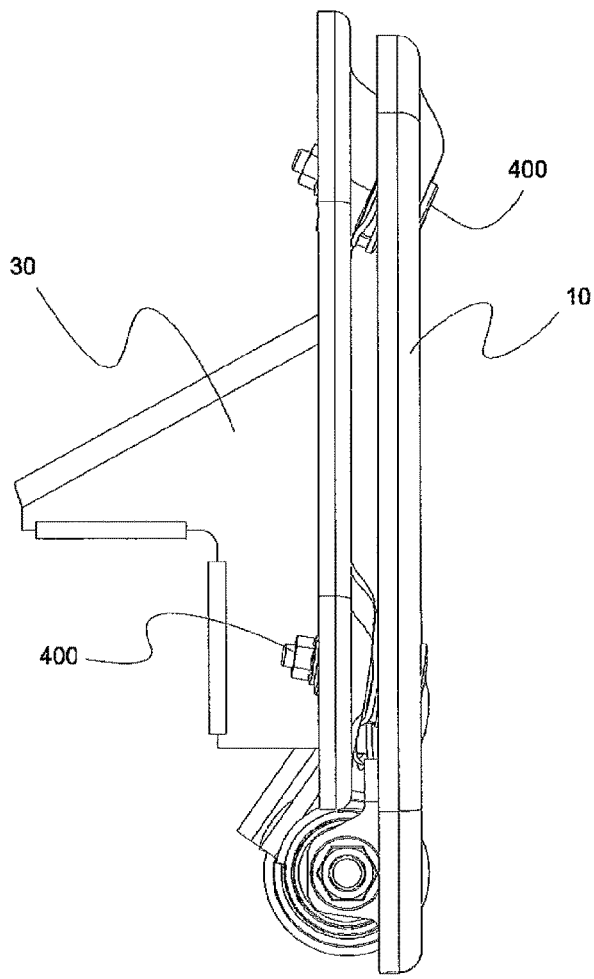
FIG. 22 is an end view of the compliant system according to FIG. 21.
Figure 23:
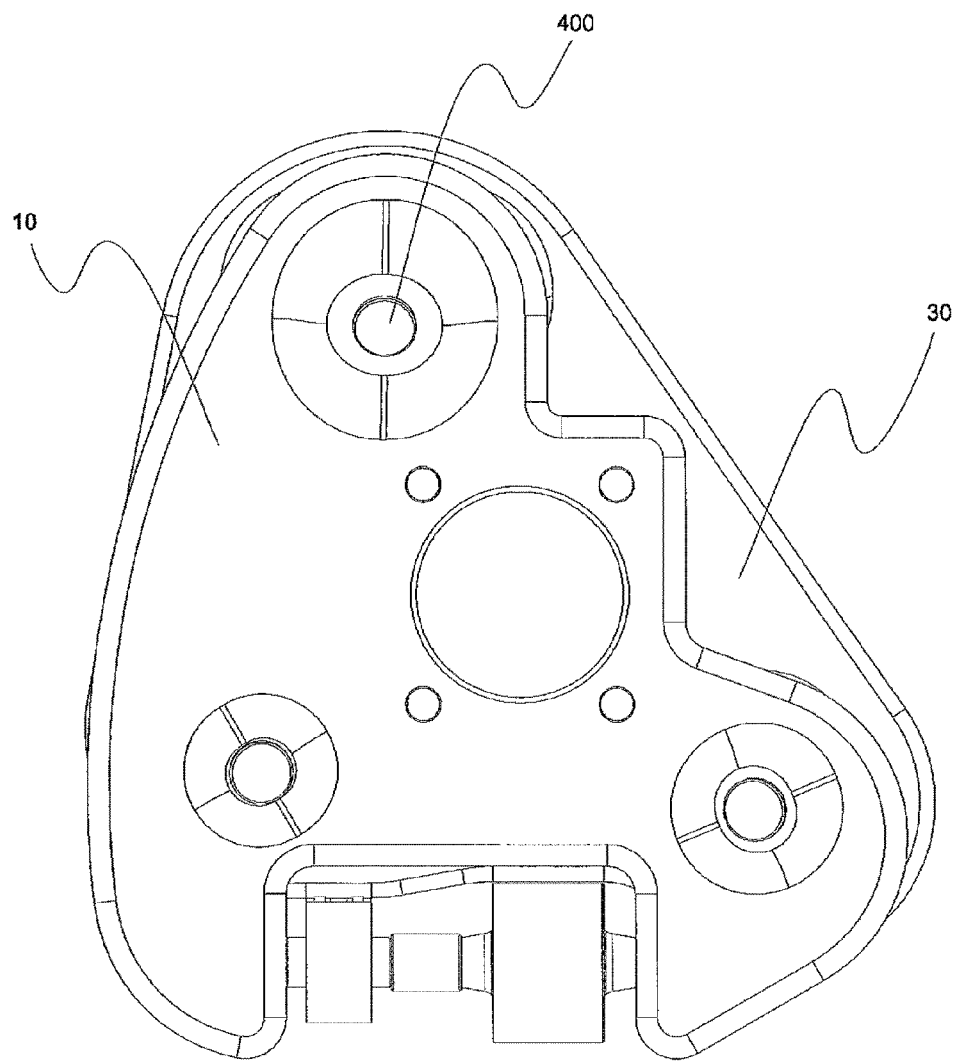
FIG. 23 is a plane view of the compliant system according to FIG. 21, however here, seen from outside the confines of a not shown vehicle.
Figure 24:
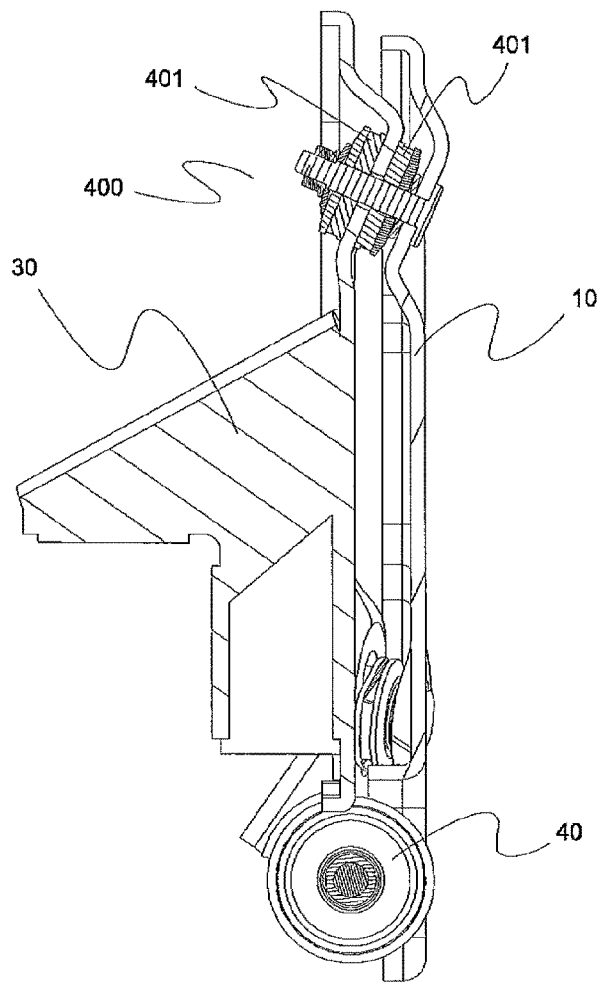
FIG. 24 is a sectional view through the compliant system according to FIG. 21.
Figure 25:
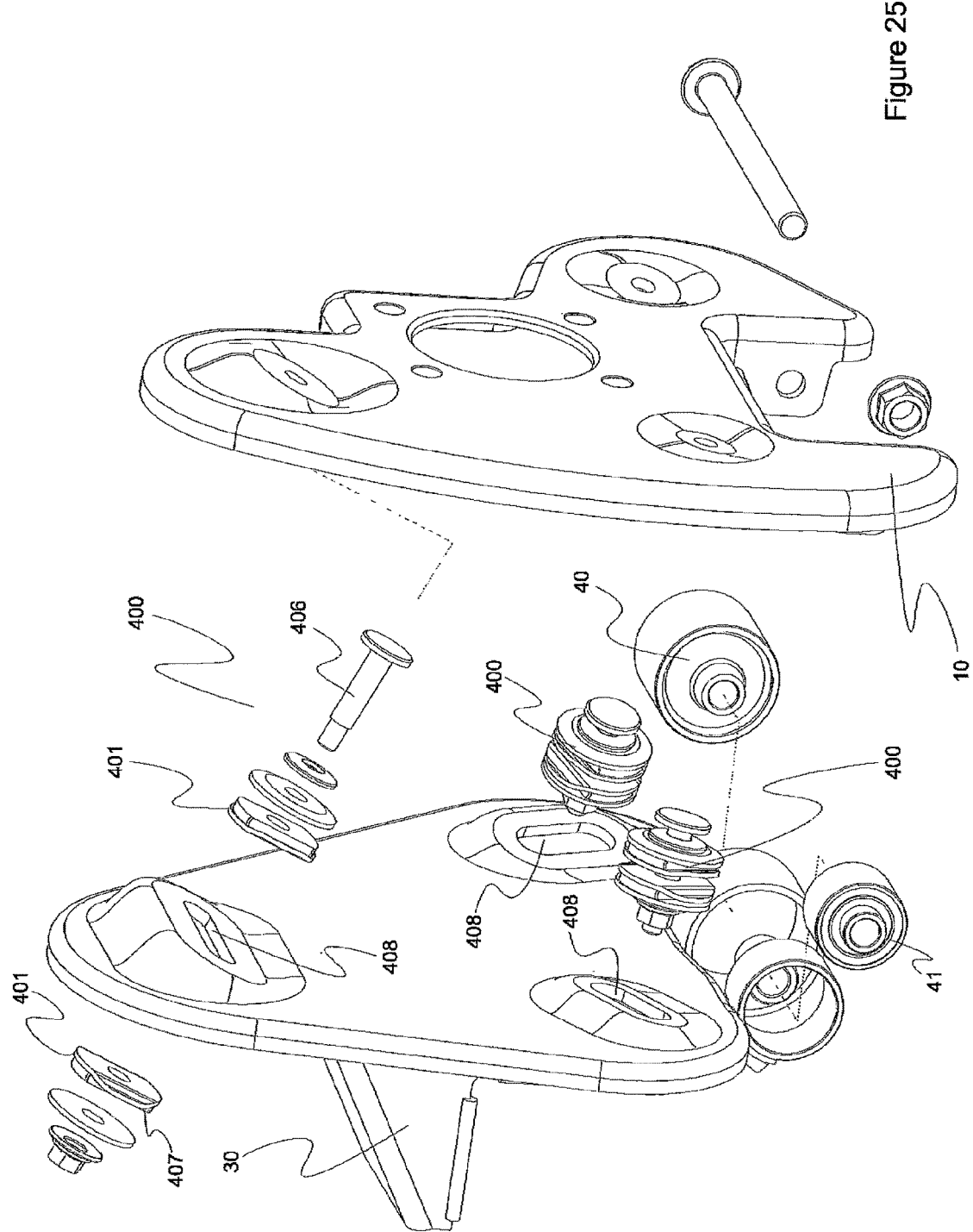
FIG. 25 is an exploded view of the compliant system according to FIG. 21.
Figure 26:
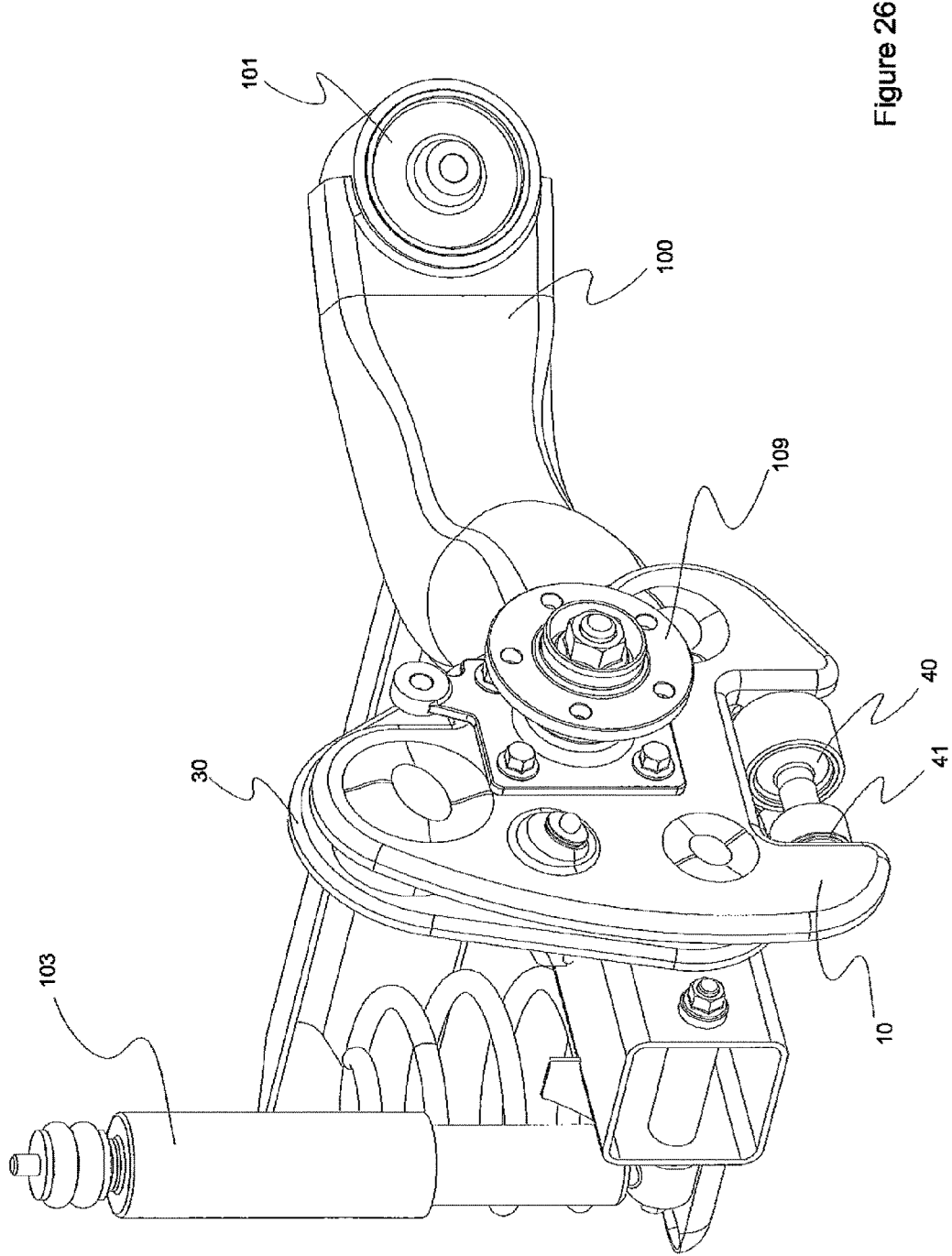
FIG. 26 is a perspective view of a part of a vehicle suspension provided with a compliant system according to one embodiment of the present invention.
Figure 27:
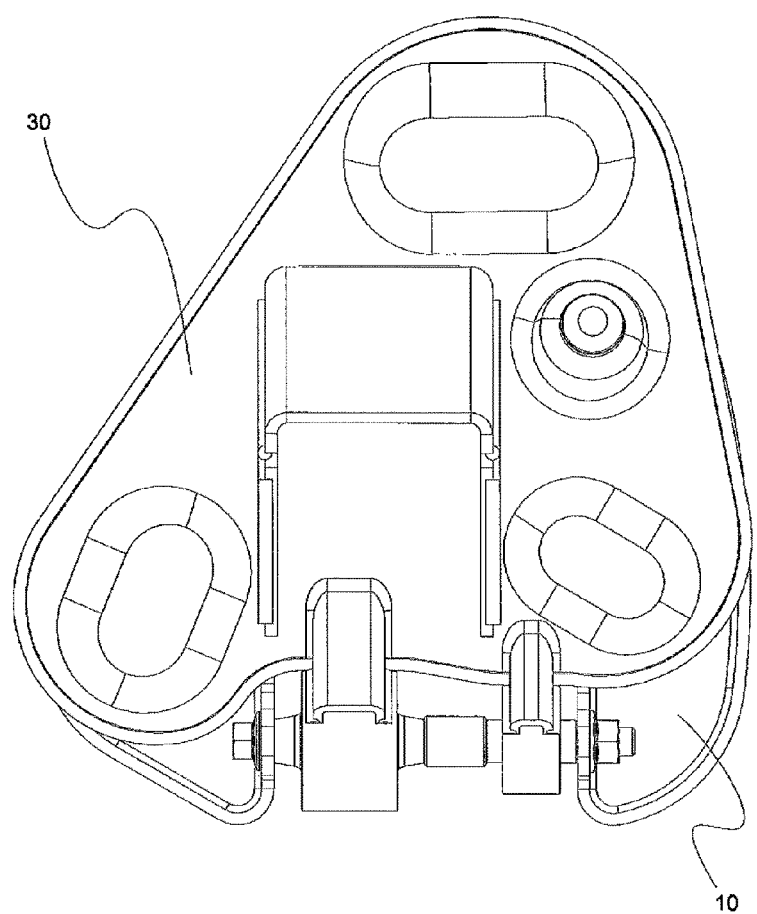
FIG. 27 is a plane view, seen from inside the confines of a not shown vehicle, of a compliant system according to one embodiment of the present invention.
Figure 28:
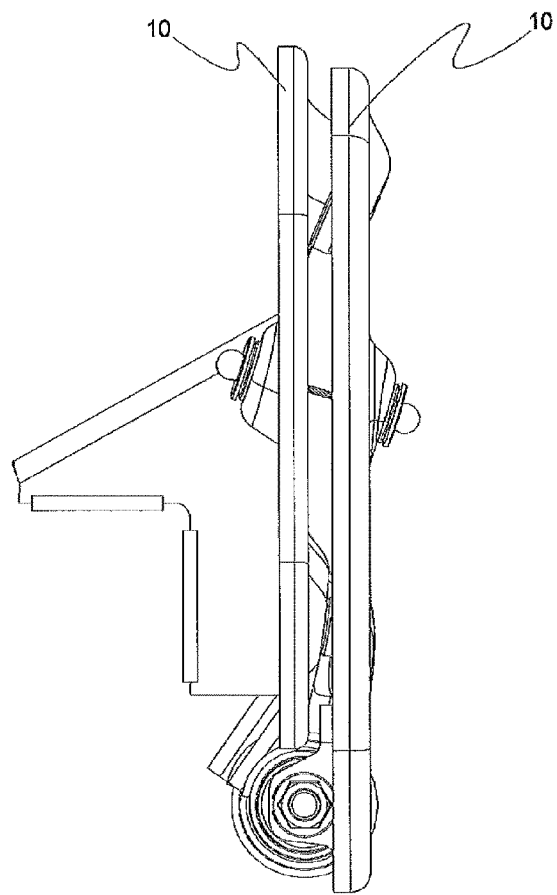
FIG. 28 is an end view of the compliant system according to FIG. 26.
Figure 29:
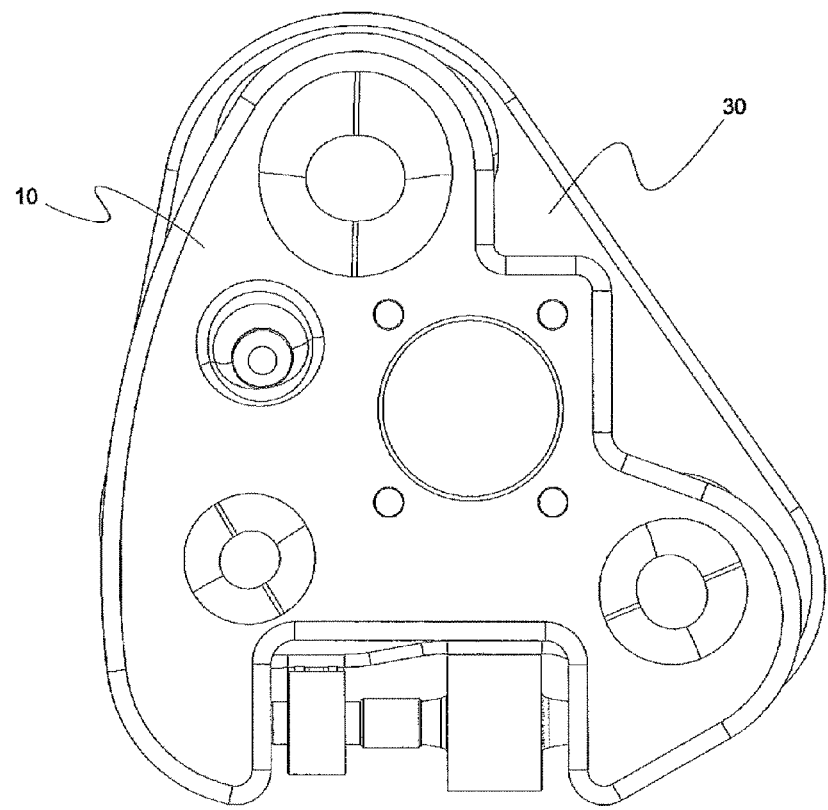
FIG. 29 is a plane view of the compliant system according to FIG. 26, however here, seen from outside the confines of a not shown vehicle.
Figure 30:
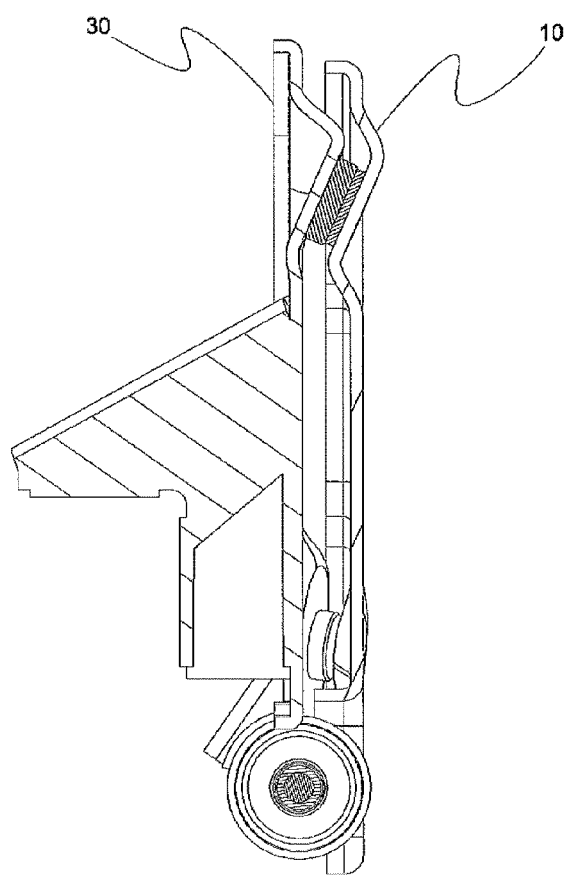
FIG. 30 is a sectional view through the compliant system according to FIG. 26.
Figure 31:
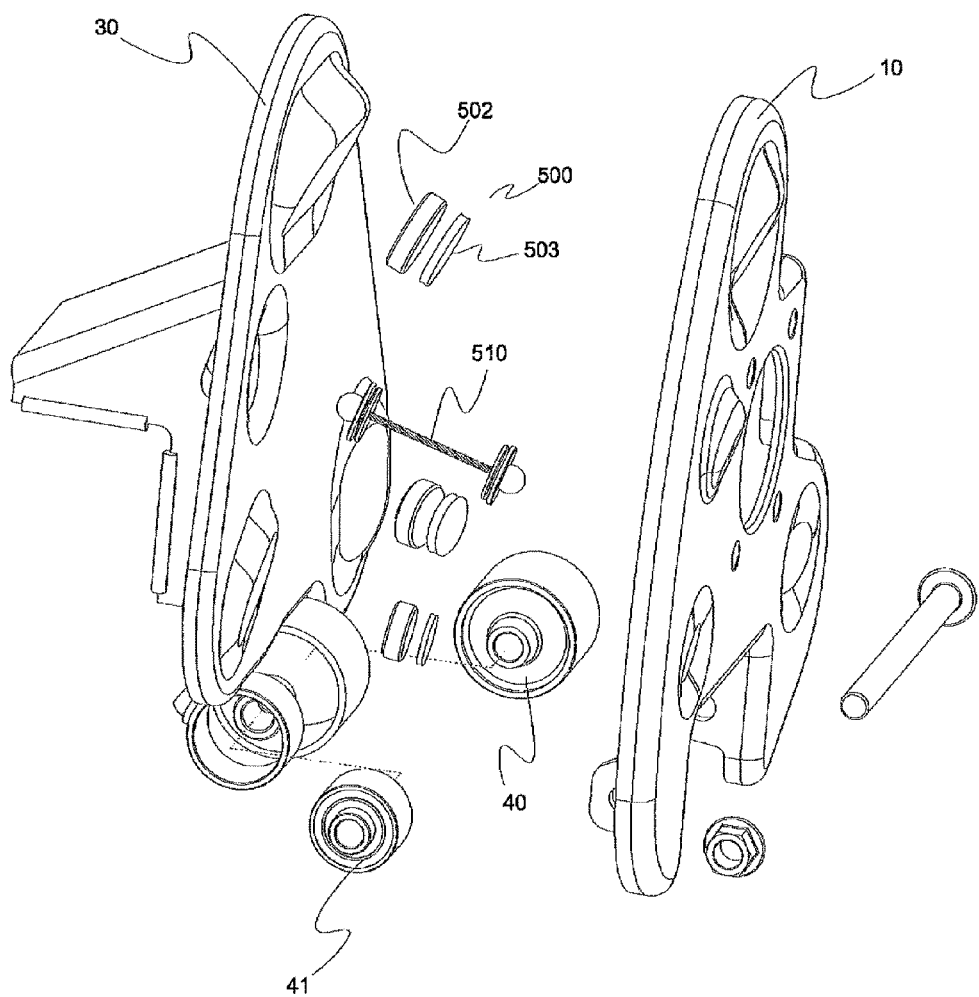
FIG. 31 is an exploded view of the compliant system according to FIG. 26.

The compressive preload may, as already mentioned, be obtained by using wires 310 or similar under tensile preload, where the preload may stem from elasticity of the wires or equivalent, or, as shown in FIG. 19, by means elastic elements and/or Belleville washers. Other not shown means for preloading the wires 310 may constitute wave springs, rubber-backed washers and/or equivalent.

Further, the wires 310 or equivalent may be resiliently mounted in, or connected to, the hub carrier 10 as well as the support 30, possibly by means of rubber bushings or equivalent.

The spheres or rolls 300 may advantageously be constrained or maintained in their position by means of a plate or a cage 305 or similar provided with holes or hollows configured for accommodating and/or maintaining the spheres or rolls 300 relative to each other. The plate or cage 305 merely contributes to the function of the system in ensuring that the relative position of the spheres or rolls is maintained in the event that loss of contact or skidding takes place. The cage itself may be located within the system by means of wires or equivalent.

A line-of-action of the wires 310 may pass through/close to the shear centre to ensure their tension forces only preload the spheres and don't try to create rotation around the shear centre, and therefore preloading the rubber bushes 40, 41.

The purpose of the shown bushes 40, 41 is in this embodiment similar to the purpose of the bushes in above described embodiments.

As the embodiment according to the FIGS. 15-19 constitutes a relatively open assembly, it may be found necessary to provide the system with a form of protection from the environment, whereby the sliding/rolling elements are ensured an optimal operating environment. The protection may constitute a form of rubber bellows or gaiters provided either for individual protection of the components or as total enclosure of the system, possibly by connecting the peripheries of the support 30 and the hub carrier 10 by means of a large bellow or gaiter.

FIGS. 20-25 shows different views of another embodiment or variant of the compliant system according to the present invention.

As can be seen in the figures, the illustrated embodiment or variant uses sliding bearings configured such that the above-mentioned back plate is rendered redundant, which obviously contribute in reducing cost as well as space requirements of the system.

The sliding elements 401, forming part of the support bodies 400, may be composed inter alia by bearings and elastic elements under preload applied by a coaxial bolt 406 or stud or equivalent.

In the shown embodiment or variant, the 406 bolt is fixed to the hub carrier 10, while the support 30 provides the surfaces on which the bearing slides.

Slots 408, defining delimitations, are provided in the support 30 to give the bolts 406 freedom to move. It should be noted that the edges of slots 408 obviously should not, under normal operation, contact the bolts 406 which would influence the functionality of the system.

As shown in the FIGS. 20-25, the system med encompass three sets of sliding elements 401, arranged to slide tangentially with respect to the desired shear centre.

As per one of the abovementioned embodiments, compliant elements may form part of the supports 400. The compliant elements may be configured to ensure a given stiffness along a non-sliding direction of the sliding elements 401. The compliant elements may constitute springs, metallic or not, Belleville washers, wave springs or rubber pads or similar.

In order to obtain a suitable preload, and thereby sliding friction, it may be advantageous to utilise non-linear springs. Non linear springs maybe obtained by applying a stiff spring in series with a softer spring that becomes rigid when fully compressed. One spring holding the mentioned property is the Belleville washer.

FIGS. 26-30 shows different views of another embodiment or variant of the compliant system according to the present invention.

As can be seen in the figures, the embodiment constitutes a combination of above described embodiments resulting in a simplification of the system.

The embodiment incorporates wires 510, in the same manner as already described with respect to the embodiment according to the FIGS. 14-19, in order to establish preload in the sliding elements 502 forming part of an assembly constituting the supports 500.

The purpose of the shown bushes 40, 41 is in this embodiment similar to the purpose of the bushes in above described embodiments.

It is worth noting that the basic suspension, onto which the component or assembly according to the present invention is mounted, may need to be configured such that its own compliant performance does not corrupt that developed by the component or assembly. Under embodiments wherein the component or assembly is provided on a twist beam axle, this would entail mounting the suspension linkage to the vehicle structure with substantially stiff bushings 101. This may have no consequence for the vertical kinematic movement of the suspension which the twist beam axle is required to provide, but would ensure it has the minimum detrimental influence on the compliant performance at the wheel.

As the components of the component or assembly according to the present invention are subject to exposure of dust, moist or water, salt and extreme temperature variances etc., the material is preferably selected such that the overall performance and reliability of the mechanism meets the general expectations of a modern vehicle.

As per the above, the components may in some portions be made up e.g. from carbon fibres, any kind of plastics or metals like aluminium, cast iron or stainless steel and the like, incl. alloys thereof, while other portions of the components may be may up from materials particularly suitable for their intended purpose. One example could be applying a kind of sliding bearing material in the areas of the sliding interfaces 90.

As the components incl. the sliding interface 90 preferably operates without foreign bodies and the like, the component or assembly according to the present invention may be provided with suitable enclosures such as bellows and the like establishing a "clean" environment for the components.

Further, the sliding interfaces are, as per the above, described as substantially plane faces. This is however not an essential feature of the present invention, as the sliding interfaces may take a spherical shape or the like.

It may be possible to integrate the hub carrier 10 and the bracket or back-plate 20 into a single not illustrated component resulting in potential cost savings. Under such embodiments, a possible axial preload of the support bodies may be effected with a different mechanism than the one already described, e.g. by means of spacers, shims, locks, lockplates, adjusting screws or equivalent.

Finally, although not shown in the figures, the sliding interfaces 90 may comprise means preventing unintended separation of the components. Such means may constitute a track or groove adapted to receive a counterpart extending from the opposite part of the sliding interface 90.

The application and combination of features and solutions presented by the present invention is not limited to the presented embodiments. One or more features of one embodiment can and may be combined with one or more features of other embodiments, whereby not described. but valid, embodiments of the present invention may be obtained.

The term "comprises/comprising/comprised of" when used in this specification incl. claims is taken to specify the presence of stated features, integers, steps or components but does not preclude the presence or addition of one or more other features, integers, steps, components or groups thereof.

The invention claimed is:

1. A compliant system for a base suspension of a vehicle, said system comprising inter alia:
   a support configured to be supported by said base suspension,
   a hub carrier attached to said support by means of a compliant connection, where said hub carrier is configured for supporting a wheel carrier,
   at least one elastic element interconnecting said hub carrier and said support, and where said at least one elastic element is arranged such that said hub carrier (10) is urged towards a predetermined position with respect to said support,
   support bodies at least partially interconnecting, at connection points, said support (30) and said hub carrier and forming part of said compliant connection between said hub carrier and said support, said support bodies are configured for providing said system with a first resistance to movement in a first direction and a second resistance to movement in directions normal, or orthogonal, to said first direction and where theoretical axes, defined by said first directions, converge or meet at a virtual focal point or area lying outside confines defined by a wheel mounted on said wheel carrier, where said second resistance to movement provided by said support bodies, in directions normal to said first directions are such that said connection points on said hub carrier are free to move, within a delimitation, in directions normal, or orthogonal, to said first directions with respect to said support, and where said first resistance to movement in said first directions is defined by a rigidity of said support bodies in said first directions, and
   said support bodies are configured to allow movement of said hub carrier, relative to said support, in directions tangential to said point such that said support bodies create a virtual ball joint between said hub carrier (10) and said support which possess a centre convergence of said three first directions.

2. A compliant system for a base suspension of a vehicle according to claim 1, wherein said second resistance to movement provided by said support bodies is, under movement of said hub carrier with respect to said support and within the delimitation, virtually unchanged regardless of said hub carriers position with respect to said support.

3. A compliant system for a base suspension of a vehicle according to claim 2, wherein said support bodies constitutes an assembly of components being rigidly connected to said hub carrier and defining, by means of sliding elements cooperating together with surfaces provided on said support, sliding interfaces between said hub carrier and said support, and wherein said support bodies constitutes an assembly made up from two opposed sliding elements arranged on a shank, where said sliding elements define said sliding interfaces on opposed sides of said support.

4. A compliant system for a base suspension of a vehicle according to claim 3, wherein said assembly making up said support bodies further comprises elastic elements arranged on said shank, and wherein said shank constitutes a bolt adapted to bring said sliding elements into compressive preload.

5. A compliant system for a base suspension of a vehicle according to claim 1, wherein said compliant system comprises three assemblies constituting support bodies, such that a total of six sliding interfaces are defined, three on each face of said support or three on each face of said hub carrier.

6. A compliant system for a base suspension of a vehicle according to claim 1, wherein said axes, defined by said first directions, are oriented such that said axes, or a component thereof, is oriented substantially transverse to said vehicle, and at least two of said axes, defined by said first directions, converge at a point or an area outside the confines of said wheel, when viewed from above.

7. A compliant system for a base suspension of a vehicle according to claim 1, wherein said support bodies constitutes an assembly of components being rigidly connected to said support and defining, by means of sliding elements cooperating together with surfaces provided on said hub carrier, sliding interfaces between said hub carrier and said support, and wherein said support bodies constitutes an assembly comprising two opposed sliding elements arranged on a shank, where said sliding elements define said sliding interfaces on opposed sides of said hub carrier.

8. A compliant system for a base suspension of a vehicle according to claim 1, wherein said support bodies constitutes rolling means interposed between said hub carrier and said support, where said hub carrier and said support are provided with surfaces configured for, together with said rolling means, establishing rolling interfaces.

9. A compliant system for a base suspension of a vehicle according to claim 8, wherein said compliant system comprises three rolling means such that that a total of six rolling interfaces are defined; three interfaces on said hub carrier and three interfaces on said support, and wherein said rolling means constitute spheres or rolls.

10. A compliant system for a base suspension of a vehicle according to claim 1, wherein said hub carrier further comprise a plurality of outer portions configured for abutting said support bodies, said support bodies being connected to said support, and a back plate provided with a plurality of outer portions configured for abutting said support bodies, and wherein said support supports six support bodies each having a compliant or flexible portion and a sliding portion, where said flexible portion and said sliding portion in series connects said support with said hub carrier.

11. A compliant system for a base suspension of a vehicle according to claim 1, wherein said compliant system is provided as a component or assembly prepared for being mounted onto a twist beam rear axle.

12. A vehicle suspension system comprising a compliant system according to claim 1, wherein said vehicle suspension further is provided with an in-wheel drive motor.

13. A vehicle suspension system comprising a compliant system according to claim 12, wherein said drive motor is interposed in-between said base suspension and said compliant system.

14. A vehicle suspension system comprising a compliant system according to claim 1, wherein said compliant system is attached to a steerable base suspension wherein a kingpin axis is interposed between said suspension system and a wheel or interposed between the kingpin axis and the steered wheel.

15. A vehicle comprising a compliant system according to claim 1.

* * * * *